(12) United States Patent
Currier et al.

(10) Patent No.: US 6,684,362 B1
(45) Date of Patent: Jan. 27, 2004

(54) METHOD AND APPARATUS FOR CONNECTING MANUFACTURING TEST INTERFACE TO A GLOBAL SERIAL BUS INCLUDING AN I² C BUS

(75) Inventors: Guy Richard Currier, Rochester, MN (US); James Scott Harveland, Rochester, MN (US); Sharon Denos Vincent, Rochester, MN (US); Paul Leonard Wiltgen, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/251,032

(22) Filed: Feb. 18, 1999

(51) Int. Cl.$^7$ ............................................. H03M 13/00

(52) U.S. Cl. ..................................................... 714/758

(58) Field of Search ........................ 714/758, 759–772, 714/752–757, 746–751, 799, 800–824, 1, 2, 7, 31; 710/110, 107, 113, 116, 117, 158, 306, 309–310, 315, 313, 62; 370/438

(56) References Cited

U.S. PATENT DOCUMENTS 6,081,865 A * 6/2000 Tavallaei et al. ............ 710/309
6,188,381 B1 * 2/2001 van der Wal et al. ....... 345/554
6,553,439 B1 * 4/2003 Greger et al. ................ 710/62

FOREIGN PATENT DOCUMENTS

JP  07-028750  1/1995
JP  10-326251  12/1998

* cited by examiner

*Primary Examiner*—Albert Decady
*Assistant Examiner*—Guy Lamarre
(74) *Attorney, Agent, or Firm*—Joan Pennington

(57) ABSTRACT

Methods and apparatus are provided for connecting a manufacturing test interface to a global serial bus, such as an inter integrated circuit (I²C) bus. Input/output buffer logic buffers data to be transferred to and from the global serial bus. A slave interface logic connected to the input/output buffer logic receives and sends data to the input/output buffer logic. A slave controller coupled to the input/output buffer logic and the slave interface logic paces data exchange to the input/output buffer logic. Error detection logic is coupled between the input/output buffer and the global serial bus for detecting error conditions.

37 Claims, 13 Drawing Sheets

PRIMITIVE WRITE CONTROL FLOW

PRIMITIVE READ CONTROL FLOW

REGISTER WRITE CONTROL FLOW

REGISTER READ CONTROL FLOW

CONTROL WRITE CONTROL FLOW

CONTROL READ CONTROL FLOW

METHOD AND APPARATUS FOR CONNECTING MANUFACTURING TEST INTERFACE TO A GLOBAL SERIAL BUS INCLUDING AN I² C BUS

FIELD OF THE INVENTION

The present invention relates generally to the data processing field, and more particularly, relates to methods and apparatus for connecting a manufacturing test interface to a global serial bus, such as, an inter integrated circuit ($I^2C$) bus.

DESCRIPTION OF THE RELATED ART

The $I^2C$ bus is an industry standard serial bidirectional 2-wire bus typically used to interconnect multiple integrated circuits by one or more masters and slaves. The $I^2C$ bus includes two bus lines, a serial data line (SDA) and a serial clock line (SCA). The $I^2C$ bus supports any integrated circuit (IC) fabrication process, such as negative-channel metal oxide semiconductor (NMOS), complementary metal oxide semiconductor (CMOS), and bipolar. Serial data (SDA) and serial clock (SLC) information are carried by two wires between multiple devices connected to the $1^2C$ bus.

A need exists for methods and an effective mechanism to connect a manufacturing test interface, such as a Joint Test Action Group (JTAG) interface IEEE 1149.1 specification, to a global serial bus including an inter integrated circuit ($I^2C$) bus. It is desirable to use the global serial bus, such as the $I^2C$ bus, to query VPD information, provide register access, and perform testing in multiple devices attached to the serial bus including memory and IO subsystems.

SUMMARY OF THE INVENTION

A principal object of the present invention is to provide methods and apparatus for connecting a manufacturing test interface to a global serial bus, including an inter integrated circuit ($I^2C$) bus. Other objects are to provide such methods and apparatus substantially without negative effects and that overcome many of the disadvantages of prior art arrangements.

In brief, methods and apparatus are provided for connecting a manufacturing test interface to a global serial bus, such as an inter integrated circuit ($I^2C$) bus. Input/output buffer logic buffers data to be transferred to and from the global serial bus. A slave interface logic connected to the input/output buffer logic receives and sends data to the input/output buffer logic. A slave controller coupled to the input/output buffer logic and to the slave interface logic paces data exchange to the input/output buffer logic.

In accordance with a feature of the invention, error detection logic is coupled between the input/output buffer and the global serial bus for detecting an error.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Figure 1:
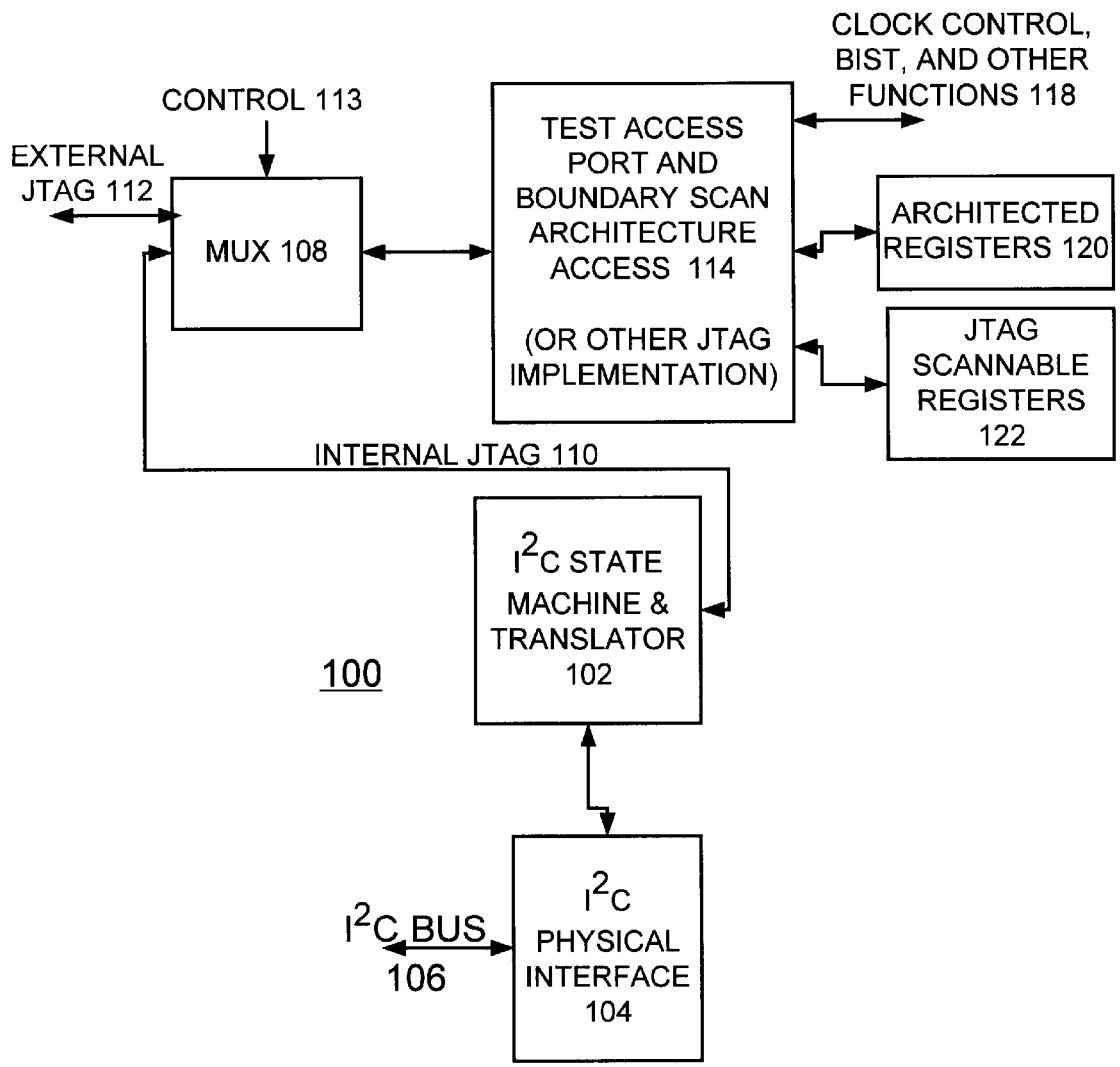
FIG. 1 is a block diagram representation of manufacturing test interface and global inter integrated circuit ($I^2C$) bus interconnection apparatus in accordance with the preferred embodiment.

Having reference now to the drawing, FIG. 1 illustrates a manufacturing test interface and global inter integrated circuit (I2C) bus interconnection apparatus generally designated by the reference character 100 in accordance with the present invention. Manufacturing test interface and I²C bus interconnection apparatus 100 includes a slave I²C state machine and translator 102 connected via an I²C physical interface 104 to an I²C bus 106. Manufacturing test interface and I²C bus interconnection apparatus 100 can be defined by a single integrated circuit chip. I²C state machine and translator 102 is connected with a multiplexer (MUX) 108 via an internal JTAG bus 110. MUX 108 is connected to an external JTAG bus 112. A control input 113 is applied to the MUX 108 to select between the internal JTAG bus 110 and the external JTAG bus 112. A test access port and boundary-scan architecture, Access 114 or other JTAG implementation is connected between MUX 108 and clock control, built in self test (BIST) and other functions 118, up to $2^{23}$ architected registers 120, and JTAG scannable registers or test data registers (TDRs) 122.

In accordance with features of the preferred embodiment, manufacturing test interface and I²C bus interconnection apparatus 100 bridges the gap between the I²C bus 106 and JTAG test access port (TAP) Access 114 in a unique manner, allowing the interconnection apparatus to support both native I²C register transfer protocol and full JTAG functionality. Manufacturing test interface and I²C bus interconnection apparatus 100 adheres to industry standard I²C bus protocol, while not limiting JTAG functionality. Manufacturing test interface and I²C bus interconnection apparatus 100 minimizes interconnect wiring, introduces chip-level addressability, and defines direct memory mapped input/output (MMIO) read and write register addressability.

In accordance with features of the preferred embodiment, manufacturing test interface and I²C bus interconnection apparatus 100 enables the use of manufacturing test hardware for in-circuit datapath, test, and lab/field debug functions. Manufacturing test interface and I²C bus interconnection apparatus 100 introduces a new scan controller instruction, Scan Communications Read-Immediate, reducing register read response latency on I²C bus 106. Manufacturing test interface and I²C bus interconnection apparatus 100 simplifies and reduces connections for system-level manufacturing testing. System level manufacturing tests may use a single I²C connection 106 for test interface, simplifying the test hook-up procedure and software required to perform integration and burn-in tests.

I²C state machine and translator 102 converts data sent across the I²C bus 106 into native JTAG commands. I²C state machine and translator 102 can be used as a TAP controller that interfaces with Access 114 in order to perform reading, writing and scanning registers within a chip attached to I²C bus 106. I²C state machine and translator 102 can initiate Logic Built In Self Test (LBIST) or Array Built In Self Test (ABIST), scan JTAG TDRs 122, control chip clocking, as well as any other features that can be initiated via JTAG bus 112 that are implemented by Access 114. Manufacturing test interface and I²C bus interconnection apparatus 100 uses a 7 bit slave addressing mode, allowing $2^7$ slaves to be directly addressed. The protocol implies that an addressed slave responds to read/write by addressing successive bytes serially, starting in memory where defined by the particular slave. Manufacturing test interface and I²C bus interconnection apparatus 100 extends direct-addressing to $2^{23}$, operating on 8-byte aligned registers. In addition, operations other than register read/write which are supported by Access 114 are available.

The serial I²C bus 106 consists of two wires for serial data (SDA) and serial clock (SDC) which rest at 1 while the bus is quiescent. Any bus master may initiate a message transfer with a start bit (SDA 1→0 while SCL='1'). I²C bus protocol operates on packets, each one byte wide, and each followed by an acknowledge bit (0=good ask). When the message begins, the slave owns driving the SDA during the acknowledge bit timing, the master owns driving SCL and SDA at other times. Master Logic always owns the clock. Slave owns SDA on reads except for the acknowledge bit. Each SDA data/ack bit must remain stable 1 or 0 while SCL clocks (0→1→0); such that SDA is setup prior to SCL rising edge, is held after falling edge, and transitions while SCL is low.

Packet bits are transmitted most significant bit first (bit1). The start byte bits 1:7 address a particular slave chip. Bit 8 of the start byte is a read/write bit. Writes progress with the master sending bytes and the slave acknowledging. A read begins as the master writes the start byte, but the dataflow reverses after the slave acknowledges the start byte. Now the slave is sending packets and the master is acknowledging. The slave continues to send until the master Ack=1. All transmissions end with a stop bit (SCL=1 while SDA 0→1). The bus is quiescent again following the stop bit.

IEEE 1149.1 defines a 5-wire interface called test access port for communicating with boundary-scan architecture. Access 114 is a specific implementation of the Joint Test Action Group (JTAG) interface IEEE 1149.1 specification. JTAG test access port (TAP) 5 wires include JTAG test clock input (TCK), JTAG test data input (TDI), JTAG test data output (TDO), JTAG test mode select input (TMS), and JTAG test logic reset input (TRST). The rising edge of test clock input (TCK) causes TMS and TDI to be sampled by Access 114.

The value of JTAG test mode select input (TMS) during the rising edge of TCK causes a state transition in the TAP controller of Access 114. Test data input (TDI) is serial data input to Access 114. Test data output (TDO) is the serial data output from Access 114. JTAG test logic reset input (TRST) causes an asynchronous reset of the test logic (TAP→TestLogicRst) for recovering Access 114. ShiftIR is the state where an instruction is serially shifted between TDI and TDO inside Access 114. While TMS is held 0, each TCK clock causes another bit to be shifted into the instruction register from TDI and IR Status to be shifted out TDO. The contents of the instruction register determine the specific TDR addressed, or non-register operation to be performed. ShiftDR is the state where one of many data registers (TDRs) is serially connected between TDI and TDO. While TMS is held 0, each TCK clock causes another bit to be shifted into the register from TDI and (old) data to be shifted out TDO.

Figure 2:
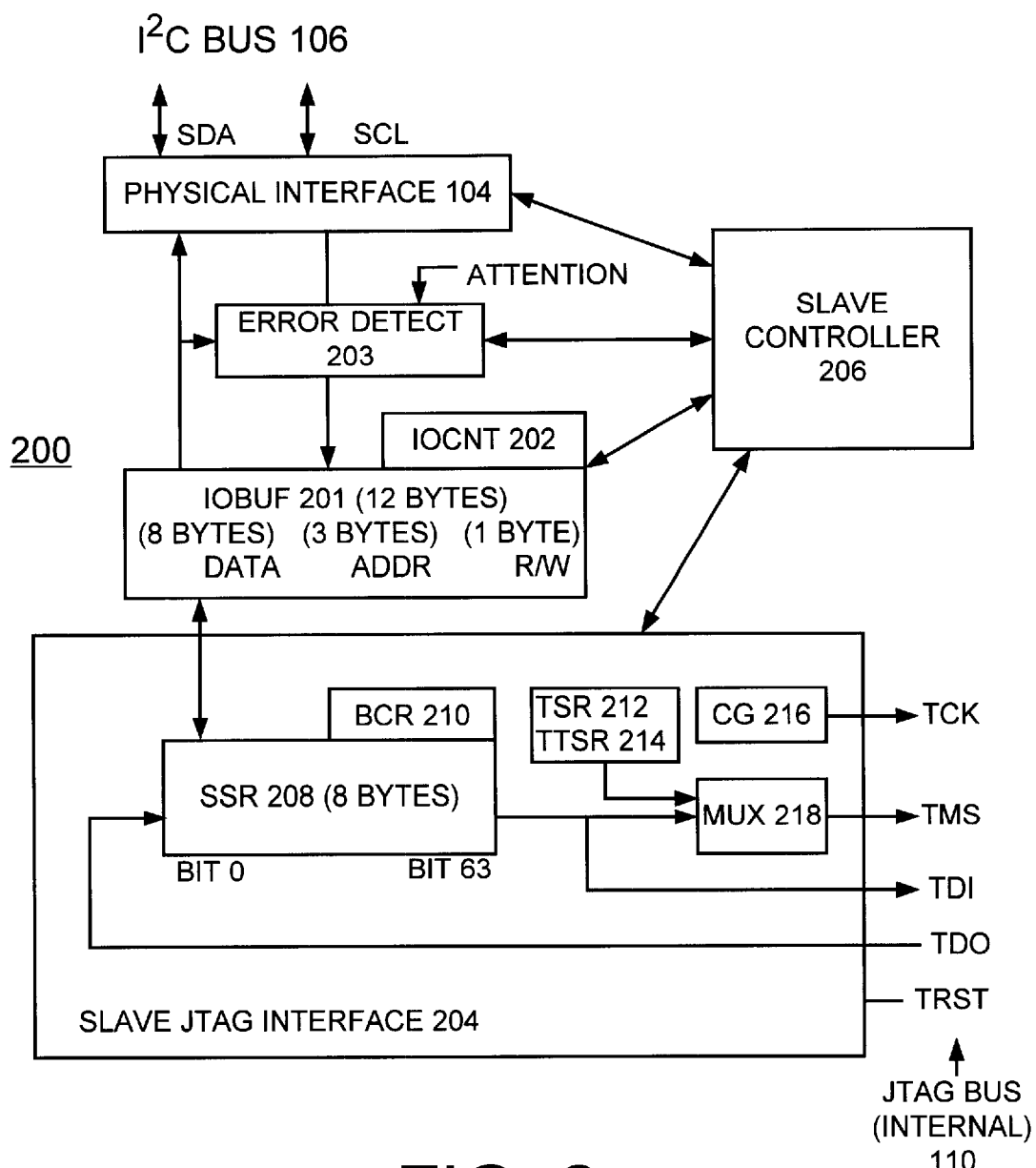
FIG. 2 is a block diagram representation illustrating slave data and control registers of the $I^2C$ slave state machine of the manufacturing test interface and global inter integrated circuit ($1^2C$) bus interconnection apparatus of FIG. 1 in accordance with the preferred embodiment.

FIG. 2 illustrates primary slave data and control registers of the I²C state machine and translator 102 generally designated 200 in accordance with the preferred embodiment. I²C slave logic 200 includes an input/output buffer register (IOBUF) 201 for data, address and register read/write (R/W) buffering and an associated input/output byte count register (IOCNT) 202. I²C slave logic 200 includes an error detect 203 coupled between the physical interface 104 and a slave JTAG interface 204. I²C slave logic 200 includes a slave controller 206 coupled to physical interface 104, input/output byte count register (IOCNT) 202, and slave JTAG interface 204. Slave JTAG interface 204 includes a serial shift register (SSR) 208 and a bit count register (BCR) 210 associated with the serial shift register (SSR) 208. Slave JTAG interface, 204 includes a test mode select (TMS) select register (TSR) 212 and TMS terminal select register (TTSR) 214, a clock generator (CG) 216 providing test clock input (TCK), and a MUX 218 providing JTAG test mode select input (TMS).

The Physical Interface 104 handles I²C protocol and timing, providing a one byte wide data interface along with associated handshaking signals. SDA refers to the bidirectional Serial Data signal defined by I²C. SCL refers to the Serial Clock signal defined by I²C. Operation of the physical interface 104 is generally in accordance with the conventional implementation of the I²C standard.

The IO Buffer (IOBUF) 201 buffers successive bytes transferred to and from the chip addressed as the Slave chip by the I²C Start Byte. Data in the IOBUF 201 is transferred in parallel, one byte at a time to and from the physical interface 104. The entire start byte is held in the IOBUF 201, but only the read/write bit is further used by the I²C state machine 102. During write operations, data flow is from I²C bus 106 to TDI or TMS of the internal JTAG bus 110. During read operations the data flow is from TDO of the internal JTAG bus 110 to I²C bus 106. The Serial Shift Register (SSR) 208 can receive or supply up to 8 bytes in parallel from and to the IOBUF 201. This data is then serially shifted to and from internal JTAG bus 110 following IEEE 1149.1 protocol.

The physical interface 104 monitors the I²C bus 106 and receives incoming/outgoing bytes. If the byte is a start byte, physical interface 104 compares the 7-bit slave address to the chip address. The start byte and remaining message are ignored if the address does not match. Physical interface 104 asserts a signal to the slave controller 206 indicating a byte has been received.

The slave controller 206 paces data exchange to and from IOBUF 201 decrementing the IO count (IOCNT) 202 to keep the data aligned properly in the IOBUF 201. When the end of the message is received or sent, or when the IOBUF overflows or underflows, the slave controller 206 transfers data between the SSR 208 and IOBUF 201 and triggers slave JTAG interface 204 to perform one or more JTAG primitive operations. As used in this specification and claims, a primitive operation is defined to mean a sequence of one or more test clock input (TCK) pulses to drive either test mode select (TMS), control, or TDI/TDO, instruction or data/status, to and from the internal slave JTAG interface 204.

Figure 3:
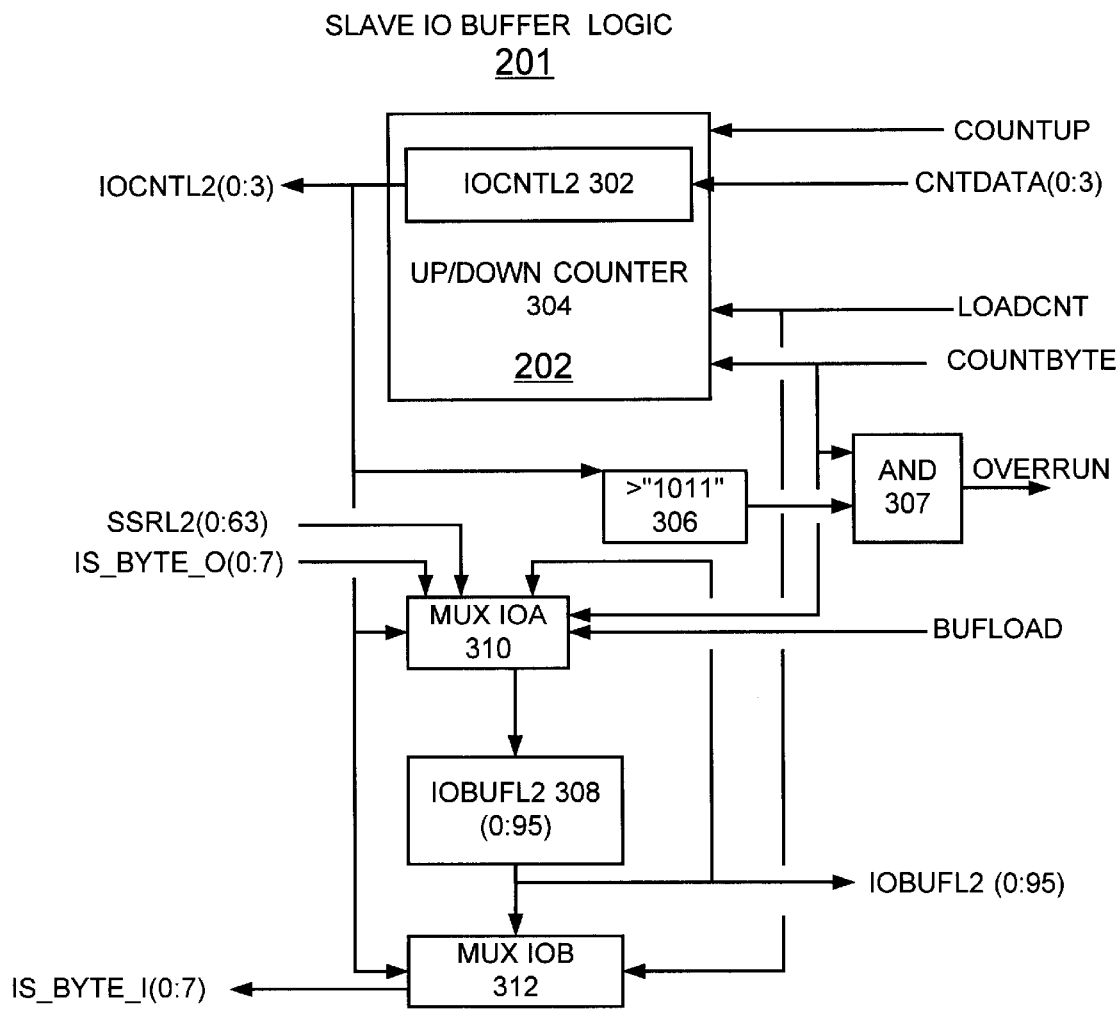
FIG. 3 is a block diagram representation illustrating a slave IO buffer logic of the $I^2C$ slave state machine of the manufacturing test interface and global inter integrated circuit ($I^2C$) bus interconnection apparatus of FIG. 1 in accordance with the preferred embodiment.

FIG. 3 illustrates the slave IO buffer logic implementing the IOBUF 201 and IOCNT 202. Slave IO buffer logic 201 and IOCNT 202 includes an IO count register (IOCNTL2) 302, an up/down counter 304, a compare (>"1011") 306, an AND gate 307, an IO buffer (IOBUFL2) 308, and a pair of multiplexers (MUX IOA, MUX IOB), 310, 312. IOCNT 202 is equivalent to IO count register (IOCNTL2) 302, and up/down counter 304.

When quiescent, the IO Count Register (IOCNTL2) 302 is parallel-loaded with Count Data (CNTDATA) of b'1011', pointing to the least-significant byte of the IO Buffer 201. The I²C state machine 102 indicates CNTDATA is valid by asserting LOADCNT, applied to IOCNTL2 302. As bytes are transferred over I²C Bus 106 the count is decremented, successively pointing at the next-most-significant byte. The I²C physical interface 104 handles transferring bits (most significant bit first), the IOBUF 201 presents and accepts bytes to and from the I²C physical interface 104 (least significant byte first).

If the start byte indicates a read operation on I²C bus 106, the I²C state machine 102 jumps IOCNT ahead to the data portion of the IO Buffer 201 by asserting LOADCNT active and CNTDATA=b'0111' in preparation of returning data to I²C bus 106.

The IOCNT register IOCNTL2 302 is reused during register read/write operations as a primitive operation step counter 304. In this mode, CountUp, applied to step counter 304, is activated by the I²C state machine 102 each time the next primitive command step in the register read/write sequence is executed. Only the IOCNTL2 and data portion of IOBUF 201 are changed, the IOBUF address and start bytes retain their values.

The 12-byte IO Buffer Register (IOBUFL2) 308 is loaded, one byte at a time, from right to left beginning with the start byte. The data from the I²C Physical Interface 104 arrives on signal IS_BYTE_O, and is indicated valid by signal COUNTBYTE from the I²C state machine 102. MUX IOA 310 feeds back IOBUF data to all bytes except the byte pointed to by IOCNT, which is replaced with the data on IS_BYTE_O.

Read information is presented to the Physical Interface 104 on signal IS_BYTE_I. MUX IOB 312 selects the IOCNT'th byte to be driven on IS_BYTE_I. Data from the SSR 208 is parallel loaded into the data portion of the IOBUF 201 when the BUFLOAD signal is activated by the I²C state machine 102. This occurs at the end of a register read primitive sequence, or after a one-step JTAG primitive command is executed at the request of an I²C command.

The data, command/address, and r/w bit are presented to the I²C state machine 102 and the SSR 208 over the IOBUFL2 (0:95) signal. The OVERRUN signal generated by AND gate 307 indicates IOBUF full/empty condition.

TABLE 1 below provides MUX definitions for multiplexers (MUX IOA, MUX 10B), 310, 312, where x indicates don't care.

TABLE 1

MUX DEFINITIONS

| | CountByte | R$\overline{W}$ | IOcntL2 | BufLoad |
|---|---|---|---|---|
| MUX IOA 310 output | | | | |
| SSRL2 (0:63) & IOBUFL2 (64:95) | x | x | x | 1 |
| IOBUFL2 (0:95) | 0 | x | x | 0 |
| IS_BYTE_O (0:7) & IOBUFL2 (8:95) | 1 | 0 | 0000 | 0 |
| IOBUFL2 (0:7) & IS_BYTE_O (0:7) & IOBUFL2 (15:95) | 1 | 0 | 0001 | 0 |
| | | 0 | 0111 | |
| etc. | 1 | x | etc | 0 |
| IOBUFL2 (0:87) & IS_BYTE_O (0:7) | 1 | x | 1011 | 0 |
| don't care (*overrun error, too much data received*) | 1 | x | >1011 | 0 |
| MUX IOB 312 output | | | | |
| IOBUFL2 (0:7) | x | | x000 | x |
| IOBUFL2 (8:15) | x | | x001 | x |
| etc | x | | etc | x |
| IOBUFL2 (56:63) | x | | x111 | x |

MUX IOB 312 does not care about the most significant bit of IOcntL2, slave logic only returns data, never address information.

Figure 4:
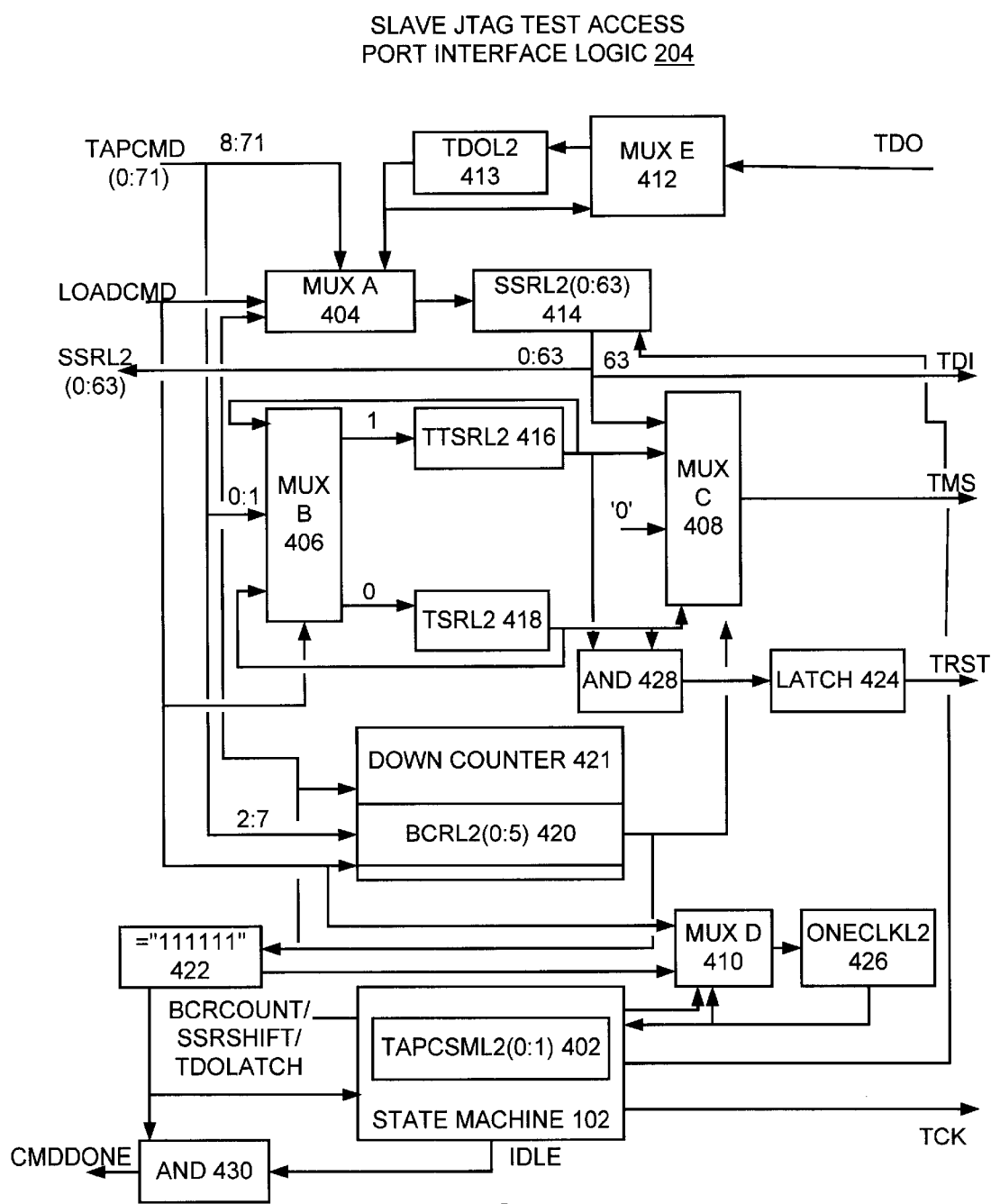
FIG. 4 is a block diagram representation illustrating a slave test access port (TAP) interface of the $I^2C$ slave state machine of the manufacturing test interface and global inter integrated circuit ($I^2C$) bus interconnection apparatus of FIG. 1 in accordance with the preferred embodiment.

FIG. 4 illustrates slave Test Access Port (TAP) interface logic implementing JTAG interface 204. Slave TAP interface logic 204 includes a TAP clock state machine (TAPCMSL2) 402, a plurality of multiplexers (MUX A, MUX B, MUX C, MUX D, MUX E), 404, 406, 408, 410, and 412, a plurality of registers (SSRL2(0:63), TTSRL2, TSRL2, BCRL2(0:5), 414, 416, 418, and 420, a down counter 421, a compare (="111111") 422, a plurality of latches 413, 424 and 426, and a pair of AND gates 428 and 430.

When the Load Command (LOADCMD) signal is activated, the Test Access Port Command (TAPCMD) is considered valid to initiate activity on the internal JTAG bus 110. The information on the TAPCMD signal is loaded into the command registers as described below, and the one clock (ONECLK2) latch 426 is set to 1 to release at one or mote TCK pulses. See definitions for TAP Clock State Machine (TAPCSM) 402, TAP Primitive Command Interface, and MUX D 410 in the following TABLES 2, 3 and 4. MUX B 406 provides feedback, holding the command registers present value while LOADCMD is not active. MUX A 404 likewise holds the SSR (data) value.

The TAP Clock State Machine (TAPCMSL2) 402 remains in idle until activated by ONECLKL2. The state machine 402 proceeds sequentially through states TCKF1, TCKR0, TCKR1 before returning to IDLE. The machine 402 continues to loop through these states as long as ONECLKL2=1. TCK is driven to 1 in the TCK Rise (TCKR0, TCKR1) states, effectively dividing the base slave clock frequency by a factor of four and providing roughly 50% duty cycle. The BCR is decremented and the SSR data is shifted one bit right in the TCKR1 state. The JTAG requirement that TDO be sampled on the rising edge of TCK is achieved by loading the TDOL2 latch 413 from TDO in the TCKR0 state. See MUX E 412 definition in TABLE 4 below.

TABLE 2

TAP CLOCK STATE MACHINE (TAPCSML2) 402

| State (encode) | Input | NextState | Output |
|---|---|---|---|
| IDLE (00) | ONECLKL2 others | TCKF1 IDLE | |
| TCKF1 (01) | | TCKR0 | reset ONECLKL2 if BCRL2 = 111111 |
| TCKR0 (11) | | TCKR1 | TCK = 1 load TDOL1 from TDO |
| TCKR1 (10) | | IDLE | TCK = 1 BCRCount = not (BCRL2 = "111111") SSRshift = 1 |

The state of the state machine 402 is greycoded to prevent glitches on TCK during state transitions. Outputs are 0 unless specified otherwise in state table.

The tap command (TAPCMD) signal applied to MUX A 404, MUX B 406, and BCRL2 420 is 9 bytes wide. The first byte is a primitive command to be performed by the JTAG Scan Logic 204. TMS Select Register (TSRL2:TAPCMD bit 0) 418 determines whether MUX C 408 will select SSR data from SSRL2 (0:63) 414 to be shifted out to TMS, or a constant value. A zero 0 indicates that the data in SSRL2 414 is a stream of TMS control information. A 1 directs MUX C to select a static 0 value driven on TMS of the first N−1 TCK clock pulses; the TTSRL2 416 value is then driven on TMS during the Nth (terminal) TCK pulse.

Terminal TMS Select Register (TTSRL2:TAPCMD bit 1) 416 provides a value on TMS during the Nth (terminal) TCK pulse. TTSRL2 416 is intended for long scanning operations when the 64-bit width of the SSR is insufficient to complete the scan. TTSRL2=0 will bridge primitive operations, allowing the scan to continue with another primitive command. TTSRL2=1 terminates the operation by moving the JTAG TAP state inside Access 114 out of the shift-DR or shift-IR state. Test Logic Reset (TRST) is formed by gating TAPCMD bits 0:1 in a combination not otherwise used for primitive commands. This output of AND gate 428 is latched by latch 424 to de-glitch the Test Logic Reset TRST signal. Bit Count Register 420 (BCRL2:TAPCMD bit 2:7) defines the number of TCK pulses to send, along with a sequence of information on TMS or TDI. A BCR value of b'111110' indicates that 64 TCK pulses are to be sent (the entire SSR register 414 will be right-shifted out of TDI or TMS, shifting TDO back into the SSR on the left. BCR= b'111111' is the terminal count, indicating that one TCK pulse is to be released.

The definition of the first byte of the TAPCMD is summarized in the following TABLE 3.

TABLE 3

TAP PRIMITIVE COMMAND INTERFACE

| Bit | Signal | Description |
|---|---|---|
| 0 | TSRL2 418 | TMS Select Register 0: TMS <= (SSR(63), shift right) * (BCRL2 + 2) 1: TMS <= 0 while BCRL2/ = 111111 TTSRL2 when BCRL2 = 111111 |
| 1 | TTSRL2 416 | TMS Terminal Select Register value driven on TMS during last bit of BCRL2 count when TSRL2 = 1 |
| | TRST | TRST <= (TSRL2 = 0) and (TTSRL2 = 1) this is a way to get TRST function without using more bits |
| 2:7 | BCRL2 420 (6 bits) | Bit Count Register load with number of bits to shift minus two: b'111110' = 64 TCK pulses (SSR shifted 63 times) b'111101' = 63 TCK pulses (SSR shifted 62 times) etc. b'111111' = one TCK pulse (SSR will not shift) Note: there is no encoding for zero pulses. |
| 8:71 | SSRL2 (64 bits) | Simple Scan Register data to be shifted out TDI (also out TMS if TSRL2 = 1) TDO => (0) SSRL2 (63) => TDI/TMS TDO is captured on the rising edge of TCK, TDI/TMS are launched (SSR is shifted) on the falling edge of TCK. |

The remaining bits of the TAPCMD signal represent data to be loaded into the SSR 208 in preparation of shifting out TDI or TMS.

When the BCR reaches b'111111' the command is done. The ONECLKL2 latch 426 returns to 0 and the TAPCMD state machine 402 rests in idle. The internal JTAG bus 110 is inactive. The CMDDONE signal output of AND gate 430 is fed back to the I²C Slave State Machine 102 as an indicator that a new primitive command may be initiated.

In the following TABLE 4 of MUX definitions for multiplexers (MUX A, MUX B, MUX C, MUX D, MUX E), 404, 406, 408, 410, and 412, x indicates don't care, and /= means is not equal to.

TABLE 4

MUX DEFINITIONS

| | Load Cmd | SSR shift | TSRL2 | BCRL2 | TAPCmdSM |
|---|---|---|---|---|---|
| MUX A (0:63) 404 output | | | | | |
| SSRL2 (0:63) | 0 | 0 | x | x | x |
| TDO & SSRL2 (0:62) | 0 | 1 | x | x | x |
| TAPCMD (8:71) | 1 | x | x | x | x |

TABLE 4-continued

MUX DEFINITIONS

| | Load Cmd | SSR shift | TSRL2 | BCRL2 | TAPCmdSM |
|---|---|---|---|---|---|
| MUX B (0:1) 406 output | | | | | |
| TSRL2 & TTSRL2 | 0 | x | x | x | x |
| TAPCMD (0:1) | 1 | x | x | x | x |
| MUX C 408 output | | | | | |
| SSRL2 (63) | x | x | 0 | x | x |
| 0 | x | x | 1 | / = 111111 | x |
| TTSRL2 | x | x | 1 | = 111111 | x |
| MUX D 410 output | | | | | |
| 1 | 1 | x | x | x | x |
| ONECLKL2 | 0 | x | x | x | / = TCKF1 |
| ONECLKL2 | 0 | x | x | / = 111111 | TCKF1 |
| 0 | 0 | x | x | = 111111 | TCKF1 |
| MUX E 412 output | | | | | |
| TDO | x | x | x | x | TCKR0 |
| TDOL2 | x | x | x | x | / = TCKR0 |

Figure 5:
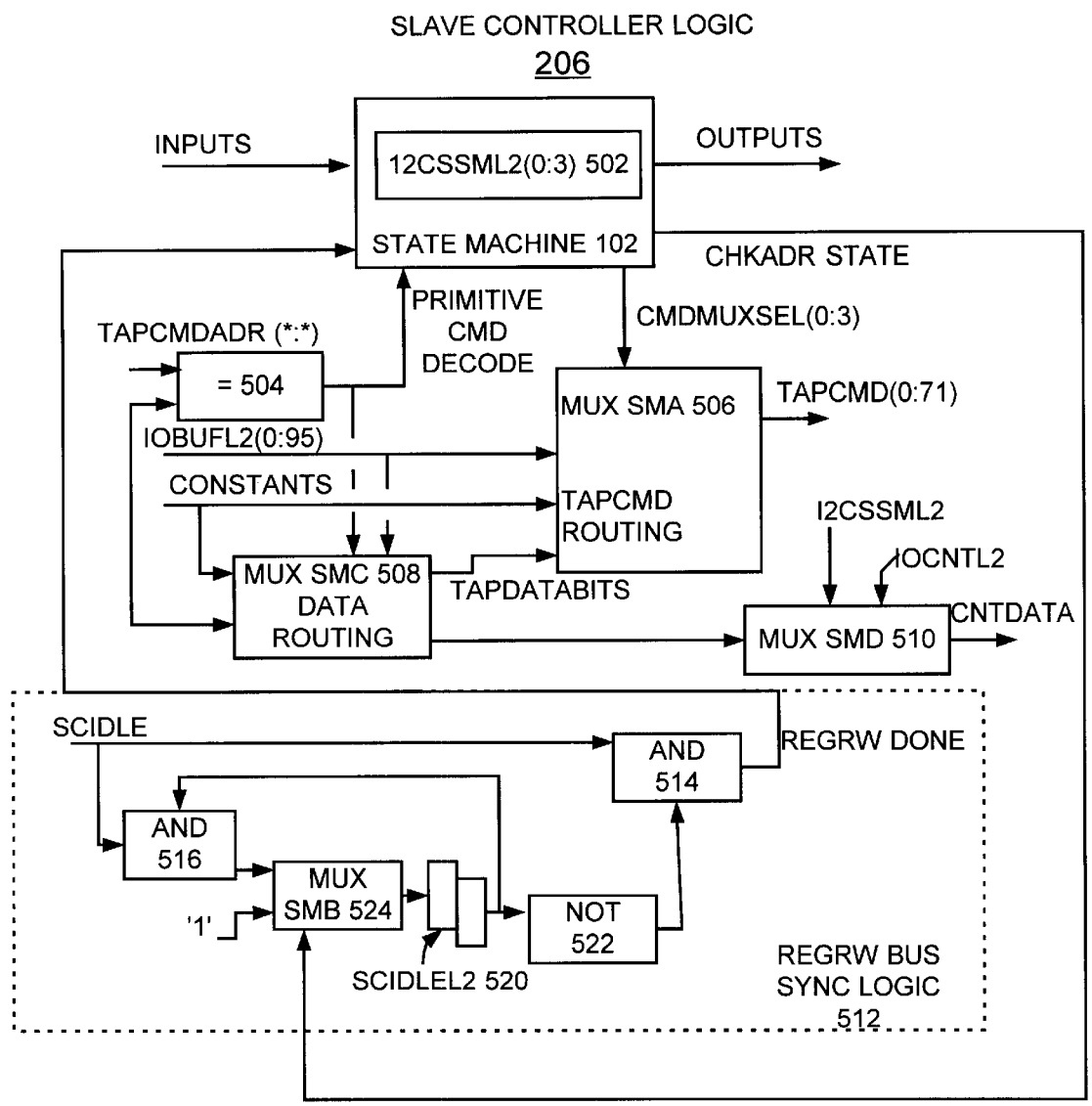
FIG. 5 is a block diagram representation illustrating a slave controller of the $I^2C$ slave state machine of the manufacturing test interface and global inter integrated circuit ($I^2C$) bus interconnection apparatus of FIG. 1 in accordance with the preferred embodiment.

FIG. 5 illustrates slave controller logic implementing slave controller 206. Slave controller logic 206 includes an I²C Slave State Machine logic (I2CSSML2(0:3) 502, a compare (=) 504, a plurality of multiplexers, MUX SMA 506 for TAP CMD routing, MUX SMB 508 for data routing, MUX SMD 510 for control. Slave controller logic 206 includes a register read/write (REGRW) bus sync logic 512. REGRW bus sync logic 512 includes a pair of AND gates 514, 516, a SC idle latch (SCIDLEL2) 520, a NOT gate 522 and a multiplexer MUX SMB 524. Slave controller logic 206 performs multiple basic functions as follows. I²C Slave State Machine logic (I2CSSML2(0:3) 502 paces data exchange between the physical interface 106 and IO buffer logic 300 and paces data exchange between the IO buffer logic 300 and JTAG scan logic 204. MUX SMA 506 for TAP CMD routing provides an ordered sequence of commands for register read/write operations. REGRW bus sync logic 512 paces data exchange between the JTAG scan logic 204 and Access 114. MUX SMB 508 for data routing minimizes I²C bandwidth requirements for data routing.

TABLES 5, 6, 7, and 8 respectively provide multiplexer definitions for MUX SMA 506, MUX SMB 524, MUX SMC 508 and MUX SMD 510 of the slave controller 206.

The IOBUF 201 and SSR 208 data do not always transfer byte for byte. If I²C uses a Primitive Command sequence to address a TDR shorter than, or not an even multiple of the IOBUF/SSR register width then the data from I²C bus 106 is left-aligned in IOBUF 201 so that an overflow can be detected when all the significant data has been received. The IOBUF 201 data is right-aligned when it is loaded into the SSR 208. The data scanned-out of the targeted TDR is left-aligned in the SSR 208 and remains left-aligned when transferred to IOBUF 201 again so that underflow of data returned to I²C can be detected at the proper time.

REGRW bus sync logic 512 uses the SCidle signal for register read/write bus synchronization. In CHKADR state, SCidleL2 latch 520 is set to 1 (assume SCIDLE signal from Access 114 is active). When a register R/W operation initiates, SCIDLE goes low, resetting ScidleL2 520. When the register read operation completes, SCIDLE and not SCidleL2 indicates the register read data is available inside Access 114. The register read sequence in the TABLE is paused after completing the third step to sync with the register read bus using this logic.

Figure 6:
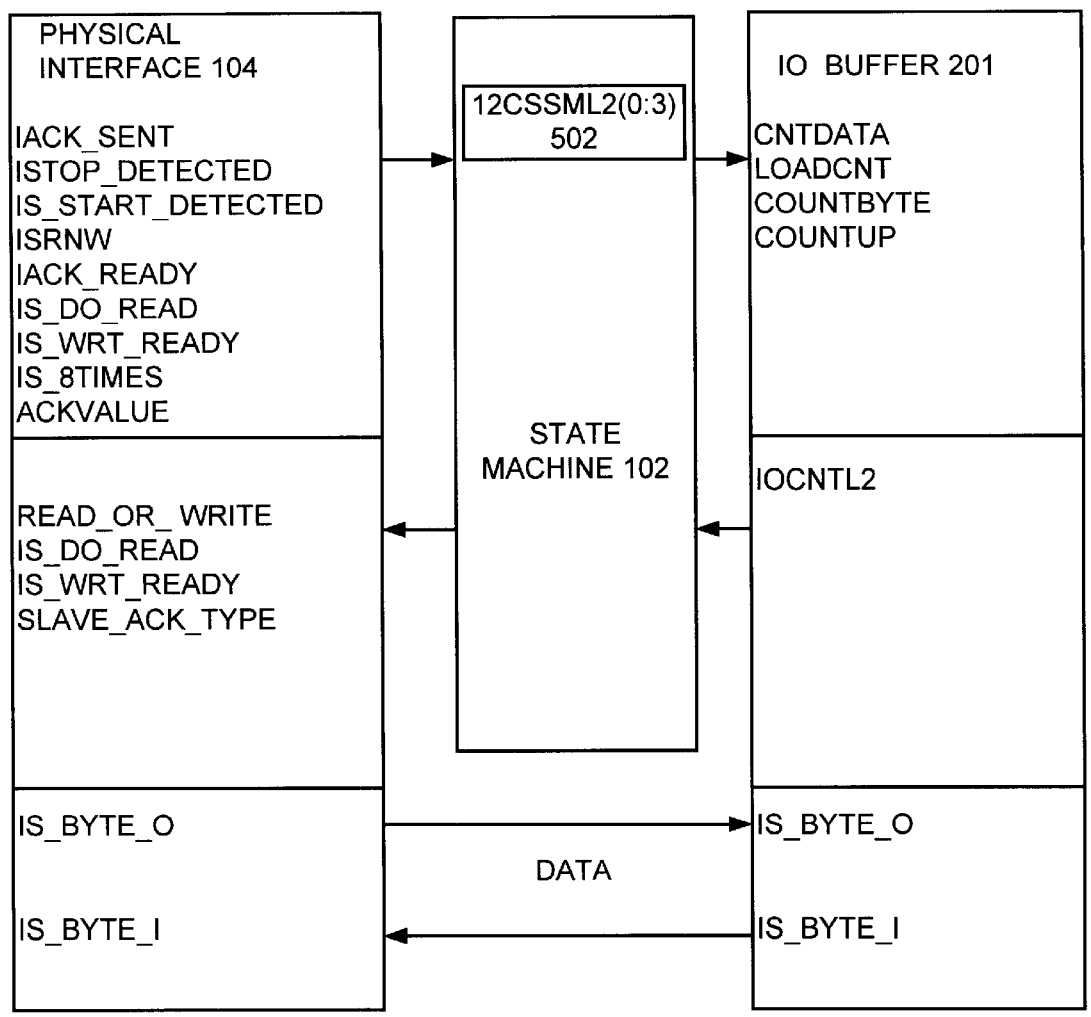
FIG. 6 is a block diagram representation illustrating data pacing between IO buffer logic of the $I^2C$ slave state machine and a physical interface of the manufacturing test interface and global inter integrated circuit ($I^2C$) bus interconnection apparatus of FIG. 1 in accordance with the preferred embodiment.

FIG. 6 shows the signals needed to pace data transfer between IOBUF 201 and physical interface 104. The signal definitions may be best understood having reference to the state machine description.

Figure 7:
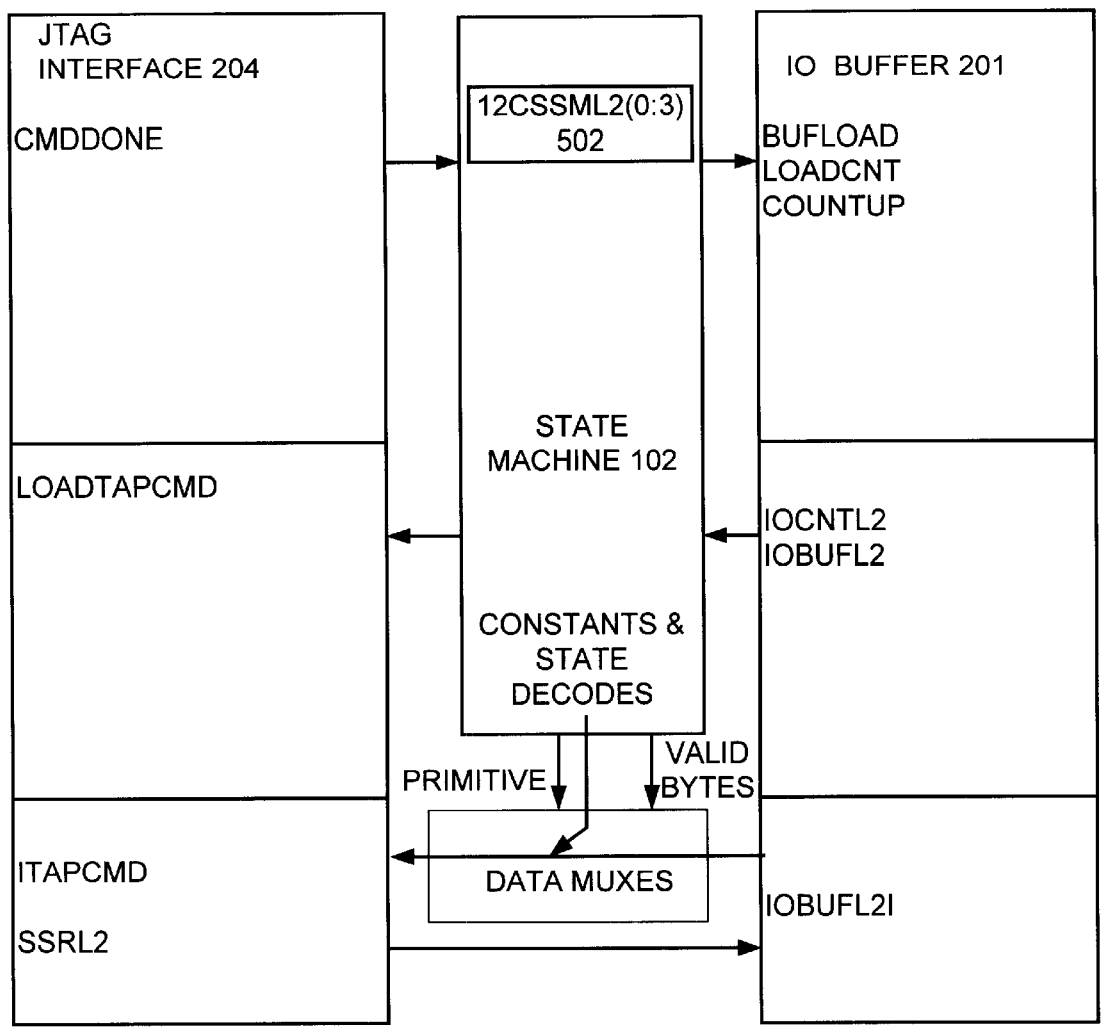
FIG. 7 is a block diagram representation illustrating data pacing between IO buffer logic of the $I^2C$ slave state machine and a slave test access port (TAP) interface of the $I^2C$ slave state machine of the manufacturing test interface and global inter integrated circuit ($I^2C$) bus interconnection apparatus of FIG. 1 in accordance with the preferred embodiment.

FIG. 7 illustrates IO Buffer 201 to JTAG Scan Logic 204 data pacing. FIG. 7 shows the signals used to pace data transfer between IOBUF 201 and JTAG Scan Logic 204. The signal definitions may be best understood having reference to the state machine description.

TABLE 5

MUX DEFINITIONS

| MUX SMA 506 output | CmdMux Sel | comments |
|---|---|---|
| IOBUFL2 (80:87) & | 0000 | tap command TapDataBits (0:63) Register Read Primitive Tap Command Sequence: |
| x'08 00000000 000000DF' | 0001 | 1. TAP = home, shiftir |
| x'DE 00000000 14' & IOBUFL2 (64:87) | 0010 | 2. IR = registerRDimmed, SSR = status, TAP = exit1ir |
| x'00 00000000 00000001' | 0011 | 3. TAP = RunTestIdle(pause here for RegisterRWDONE) |
| x'01 00000000 00000001' | 0100 | 4. TAP = shiftdr |
| x'FE00000000 00000000" | 0101 | 5. SSR = scscan (0:63), TAP = exit1dr |
| x'00 00000000 00000001' | 0110 | 6. TMS = UpdateDR, Idle |
| x'00 00000000 00000000' | 0111 | 7. no-op (TMS = 0, TCK = two clks), Idle |
| don't care | 1000 | unimplemented Register Write Primitive Tap Command Sequence: |
| x'08 00000000 000000DF' | 1001 | 1. TAP = home, shiftir |
| x'DE 00000000 0F 000040' | 1010 | 2. IR = scan, SSR = status, TAP = exit1ir |
| x'02 00000000 00000003 | 1011 | 3. TAP = shiftDR |
| x'FE' & IOBUFL2 (0:63) | 1100 | 4. scscan (0:63) = SSR, TAP = exit1dr |
| x'08 00000000 000000DF' | 1101 | 5. TAP = home, shiftir |
| x'DE 00000000 18' & IOBUFL2 (64:87) | 1110 | 6. IR = regusterwtm SSR = status, TAP = exit1ir |
| x'00 00000000 00000001' | 1111 | 7. TAP = RunTestIdle (trigger write) |

TABLE 6

MUX DEFINITIONS

| MUX SMB output | I2CSSML2 | comments |
|---|---|---|
| 1 | | = ChkAdr |
| Scidle and SCidleL2 | | others |

TABLE 7

MUX DEFINITIONS

| MUX SMC output | IOBUFL2 | comments |
|---|---|---|
| if ValidBytes = "0000" then TapDataBits = "00000000000000"X & IOBUFL2 (0:7) if ValidBytes = "0001" | Primitive Addr | TapDataBits Output: 64-Bit Field created as follows: Valid data bytes of IOBUFL2 (determined by IOBUFL2 (82:87) |

TABLE 7-continued

MUX DEFINITIONS

| MUX SMC output | IOBUFL2 | comments |
| --- | --- | --- |
| then TapDataBits = "000000000000"X & IOBUFL2 (0:15) etc. ValidBytes Output: b"0000" if 1 <= (BCR + 2) <= 8 b"0001" if 9 <= (BCR + 2) <= 15 etc. b"0111" if 57 <= (BCR + 2) <= 64 | | are right-justified and padded to the left with constant "00"X to create a 64-bit field (8-byte) ValidBytes Output: A value from "000" to "111" depending on the transfer size of the primitive cmd (i.e. from IOBUFL2 (82:87) used as a pointer to the LSByte of valid data in IOBUFL2 |
| TapDataBits: IOBUFL2 (0 to 63) ValidBytes: "111" | Others | If not a primitive cmd, TapDataBits not used. For non-primitive cmds, LSByte is always "111" (all 8-bytes IOBUF data used) |

TABLE 8

| MUX SMD output | I2CSSML2 | IOCNTL2 | IOBUFL2 | comments |
| --- | --- | --- | --- | --- |
| b"0001" | ChkAdr | x | x | IOCNTL2 is used as an up counter at this point to count the steps in an Register Read/Write sequence. |
| ValidBytes | ChkStop | x | primitive addr | Load IOCNTL2 with the location of the LSByte that is valid in IOBUFL2 |
| WrtAck | b"0111" | addr | primitive valid in | |
| b"1011" | Others | | | Point to Right-most byte of IOBUFL2 to start filling in 12C Addr Bytes |

Figure 8:
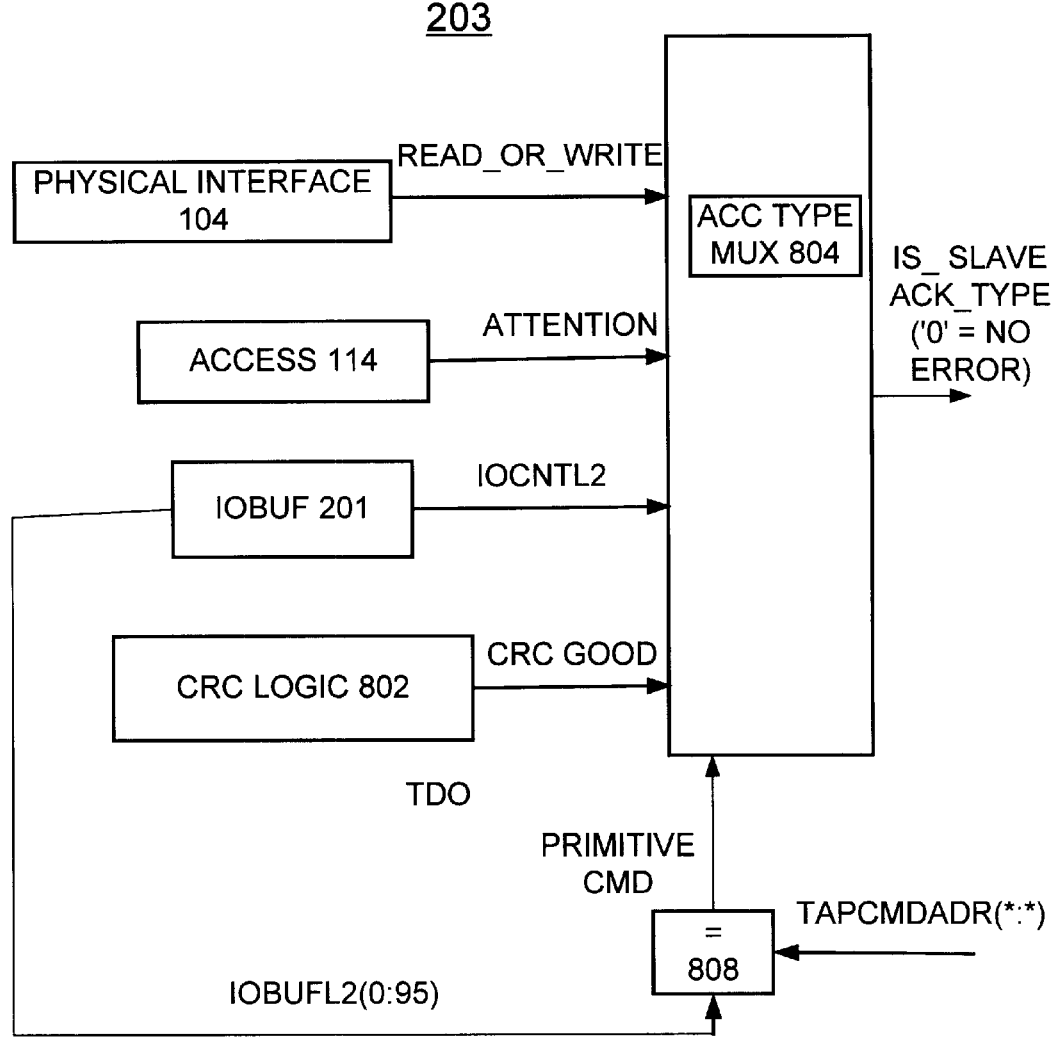
FIG. 8 is a block diagram representation illustrating a slave error handling logic of the $I^2C$ slave state machine of the manufacturing test interface and global inter integrated circuit ($I^2C$) bus interconnection apparatus of FIG. 1 in accordance with the preferred embodiment.

Referring now to FIG. 8, error handling logic implementing error detect 203 is shown. Error handling logic 203 includes a cyclic redundancy check (CRC) logic 802 for CRC checking transferred data to and from the I²C bus 106. Error handling logic 203 includes an ACK TYPE MUX 804 receiving inputs: CRC_Good, Attention, IOCNTL2, read_or_write, and a primative command from a compare 808.

The I²C state machine 102 and error handling logic 203 receives the Attention input from the JTAG TAP Controller Access 114. This Attention input from Access 114 may be activated as a result of a register read/write bus error or from a number of other error scenarios. Read_or_write is an input from I²C state machine buffered from Physical Interface 104. IOBUFL2 is an input to compare 808 from IO buffer Logic 201. TapCmdAdr applied to compare 808 is a constant configurable as internal constant, or via chip IO pins. IOCNTL2 is an input to MUX 804 from IO buffer Logic 201. CRC_Good is a signal from CRC logic 802 indicating the CRC byte was correctly transferred. Is_slave_ack_type is an output from the MUX 804 of the error handling logic 800 to the Physical Interface 104.

The I²C slave handles errors with an acknowledgment pulse. I²C requires an acknowledgment of every byte of data on the Ack or 9th clock cycle and also on 9th bit of the slave address. When the slave encounters an error, it will no longer acknowledge its address and data when trying to do a read sequence. This way software can determine that there is an error condition and use the I²C bus 106 to determine what caused the error so a recovery can be made from the error condition.

There are several situations that could cause the slave to not acknowledge on a read or a write sequence. For example, if CRC-Checking has been enabled the slave will not acknowledge the 13th byte in order to prevent software from overwriting the data. These 13 bytes include the slave address, the 3 byte register read address, 8 data bytes and a CRC byte. The write will only occur if the CRC was calculated and transmitted correctly. Without CRC checking, data will be over written if software writes more than 8 bytes of data. When the Attention signal is raised inside Access 114 and the Attention has not been blocked inside the state machine will cause a No-Ack when trying to do a register read direct sequence. If doing a write sequence and the 3-byte address sent was not a primitive address, the slave will not acknowledge the data bytes being sent across the I²C bus 106. Once CRC checking has been enabled and the CRC sent on the I²C bus was not correct, the slave will not acknowledge on the next read attempt.

TABLE 9

ERROR HANDLING LOGIC ACK TYPE MUX 804 DEFINITION

| is_slave_ack_type | Attention, read_or_write, Primitive Cmd disable_attention | comments |
| --- | --- | --- |
| 0 | Primitive Cmd = 1 Attention = x read_or_write = x | Always Positive Acknowledge when Internal IOBUFL2 (64 to 79) points to TapCmAdr |
| 0 | Primitive Cmd = 0 read_br_write = 0 and IOCNTL2 pointing to bytes 11, 10, 9 or disable_attention = 1 | Positive Acknowledge when Writing Address Bytes or attention disabled |
| ATTENTION | Primitive Cmd = 0 read_or_write = 1 or read_or_write = 0 and IOCNTL2 pointing to bytes <= 8 | Negative/Positive Acknowledge based upon ATTENTION input when either Reading or when Writing Data Bytes with non-Primitive Address in IOBUFL2 |

Figure 9:
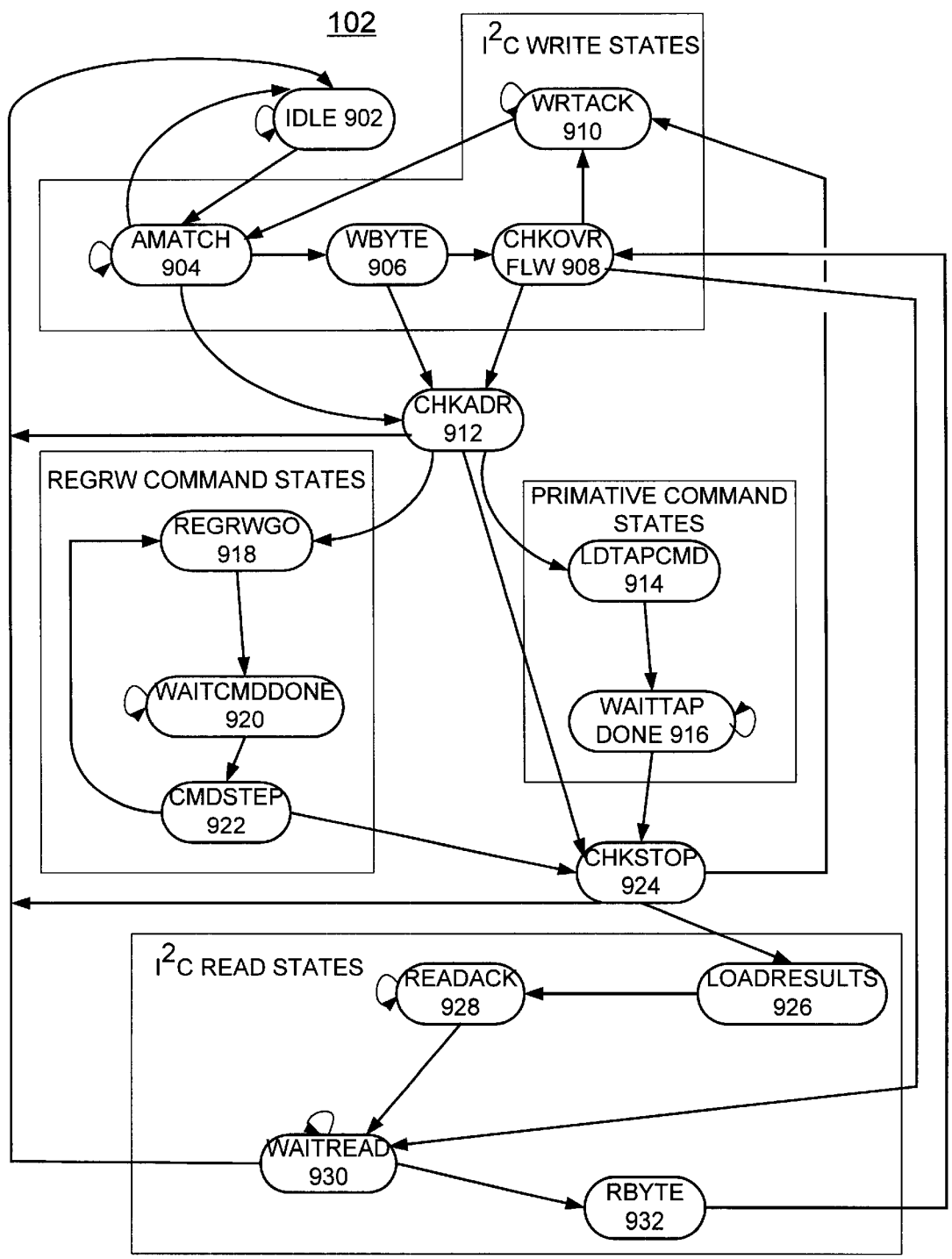
FIG. 9 is a block diagram representation illustrating multiple states of the $I^2C$ slave state machine of the manufacturing test interface and global inter integrated circuit ($I^2C$) bus interconnection apparatus of FIG. 1 in accordance with the preferred embodiment.
Figure 10A:
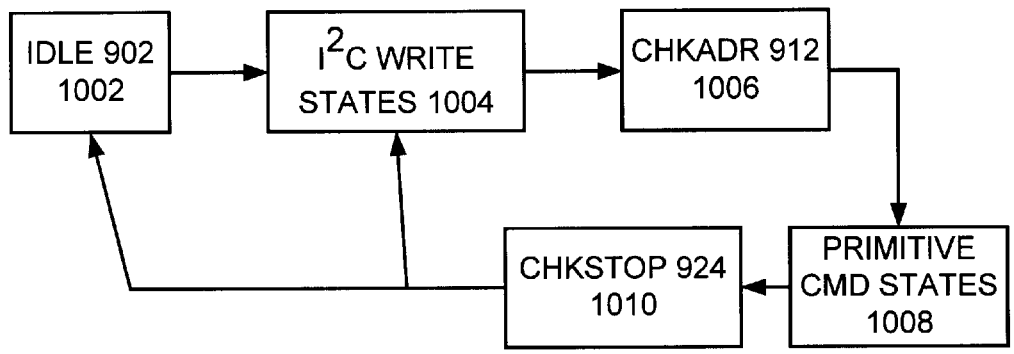
FIGS. 10A and 10B respectively illustrate primitive write control flow and primitive read control flow of the $I^2C$ slave state machine of the manufacturing test interface and global inter integrated circuit ($I^2C$) bus interconnection apparatus of FIG. 1 in accordance with the preferred embodiment.
Figure 10B:
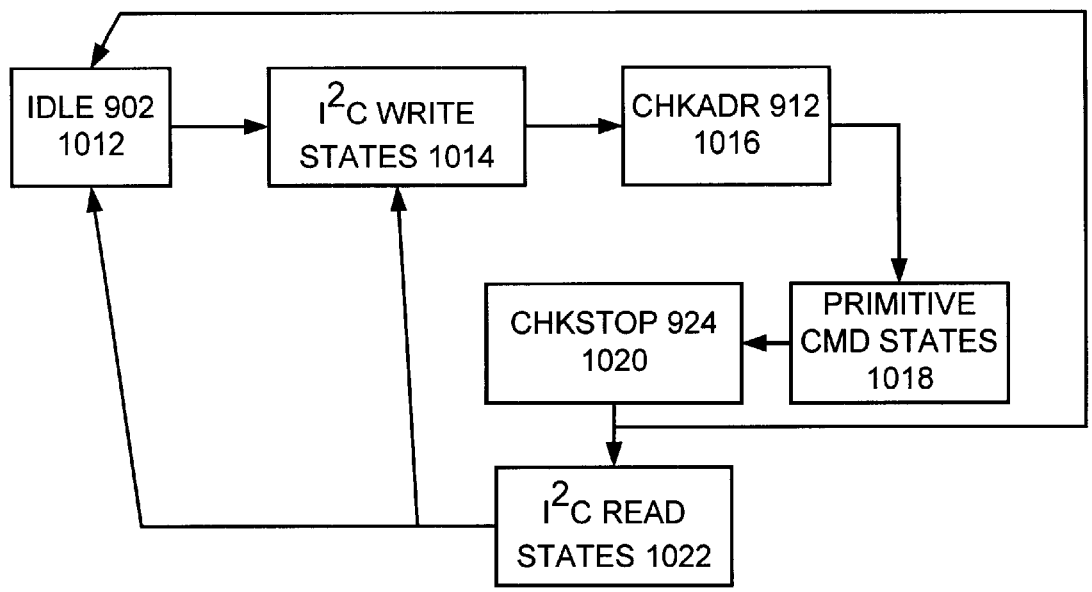
Figure 10C:
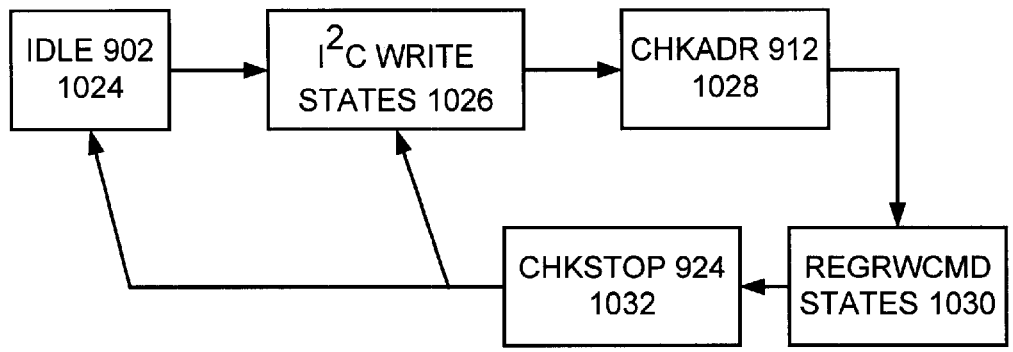
FIGS. 10C and 10D respectively illustrate register write control flow and register read control flow of the $I^2C$ slave state machine of the manufacturing test interface and global inter integrated circuit ($I^2C$) bus interconnection apparatus of FIG. 1 in accordance with the preferred embodiment.
Figure 10D:
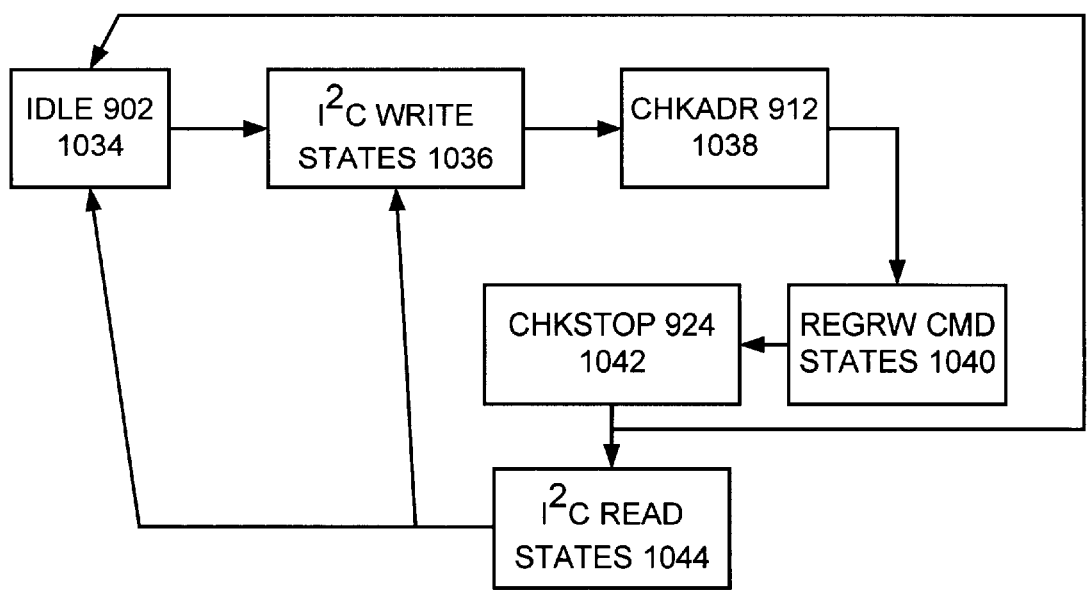
Figure 10E:
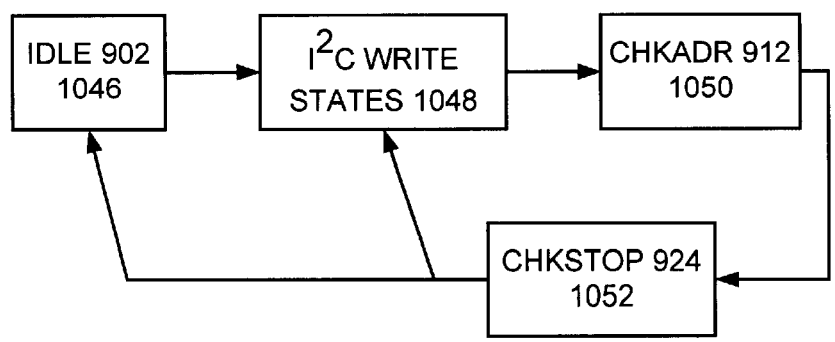
FIGS. 10E and 10F respectively illustrate control write control flow and control read control flow of the $I^2C$ slave state machine of the manufacturing test interface and global inter integrated circuit ($I^2C$) bus interconnection apparatus of FIG. 1 in accordance with the preferred embodiment.
Figure 10F:
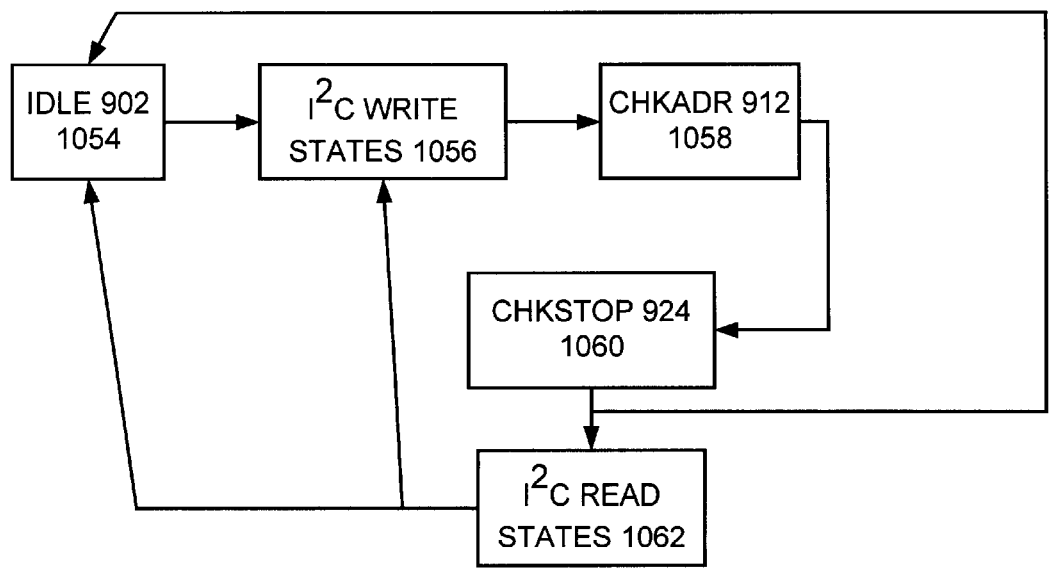

Referring now to FIGS. 9, 10A, 10B, 10C, 10D, 10E and 10F, in FIG. 9 sequential states of state machine 102 are shown. FIGS. 10A and 10B respectively illustrate primitive write control flow and primitive read control flow of the I²C slave state machine 102. FIGS. 10C and 10D respectively illustrate register write control flow and register read control flow of the I²C slave state machine 102. FIGS. 10E and 10F respectively illustrate control write control flow and control read control flow of the I²C slave state machine 102.

At an IDLE State 902 of the I²C slave state machine 102, there is no I²C activity. IOcntL2 is loaded with b'1011', pointing at LSByte of IOBUFL2 in preparation of receiving start byte. A plurality of states are I²C Write States including an AMATCH state 904, a WBYTE state 906, a CHKOVR-FLW state 908, and a WRTACK state 910. In the Write I²C states, when I²C master is writing bytes to slave, the first byte is always a start byte that addresses the slave. The eighth bit of the start byte is a Read/Write bit. The next three bytes are interpreted as either a register address, Primitive TAP Command, or Slave Control Command. The remaining bytes are data.

In the AMATCH State 904 (Address Match), the Physical Interface 104 has recognized a start bit and is assembling the (next) byte of a message. AMATCH state 904 returns to IDLE state 902 when a repeated start, or the start byte address mismatches, sending the slave back to IDLE. If the message ends before the first four bytes (start+address bytes) are received, the slave returns to IDLE. If CRC is enabled and a CRC error is detected, AMATCH state 904 returns to IDLE state 902. AMATCH state 904 moves to WBYTE state 906 when 8 or more bits are received by the Physical Interface 104. One specific implementation of the Physical Interface 104 indicates Is8times prior to IsStartDetected during the start byte, requiring Is8times to be latched (Is8timesL2) so that it is not missed. AMATCH state 904 moves to a CHKADR state 912 when a stop bit has been detected by the Physical Interface 104 after one or more bytes of data have been received.

In the WBYTE state 906 (Write Byte), the Is_Byte_O from the Physical interface is written to the IOBUFL2 (IocntL2$^{th}$byte) then IOcntL2 is decremented. WBYTE state 906 moves to CHKOVRFLW state 908 if this is an I²C write operation. The dataflow continues from master/initiator to slave. WBYTE state 906 move to CHKADR state 912 when this is I²C read operation. The dataflow reverses after the start byte. The master will now receive data from the slave.

In the CHKOVRFLW State 908, (Check for Over(under) flow in IO Buffer), there is no action. CHKOVRFLW State 908 moves to the WRTACK state 910 when this is a write operation and the IOCntL2 has not wrapped from b'0000' to b'1111', there is space for more bytes in IOBUFL2. CHK-OVRFLW state 908 moves to a WAITREAD state 910 in the case when a Register read or Primitive command has already filled IOBUFL2 and the CHKOVRFLW state 908 was entered from an RBYTE state 932 from the I²C read states. One or more bytes have already been read, but IOBUFL2 has not yet underflowed. Move to CHKADR: IOBUFL2 is full/empty, trigger a Register write/read or Primitive operation.

The WRTACK State 910 (Acknowledge the I²C byte just written to slave), provides a Good Ack action if within the first four bytes of message (start+3 address bytes). WRT-ACK State 910 provides a fail Ack if Register read address and Attention is active from Access 114. An IsDoRead (IOBUF read the byte written by I²C master) is activated to Physical Interface 104 indicating that a byte is ready for the IOBUF. NeedAckL2 is reset. If this is was the fourth byte (last address byte just written to IOBUF; IOcntL2 now=7) and address indicates a Primitive command, look at ValidBytes, which is decoded from the BCR field of the Primitive to jump IOcntL2 ahead in the data buffer. For example: BCR=b'000000', only two bits will be transmitted to Access 114 so only one byte of data is needed. IOcntL2 is advanced to b'0000' so that the overflow will occur immediately after the first byte of data. Otherwise I²C would have to waste time transmitting another 7 bytes of data that are insignificant.

The WRTACK state 910 moves to AMATCH state 904 with NeedAckL2. The Physical Interface 104 activates IsAckSeht for one cycle after the ack is sent/received. NeedAckL2 remembers, in case the slave state machine was waiting until the Ack was sent.

In the CHKADR state 912 (Check Address), the IOBUFL2 address field is examined to determine if this is a Register read/write, Primitive, or Control command where I²C Slave Command Formats are used. Primitive signal is active for both Primitive and Control operations. SCidleL2 is set in case this is a Register read/write operation. REGRW Bus Sync Logic 512 will monitor the Register read/write (architected register r/w) bus to keep the JTAG command steps from overrunning the Register read/write operation. The IOcntL2 reg is set to b'0001' in case this is a Register read/write operation. In this case, IOCNT will step through a defined sequence of Primitive TAP commands in order to accomplish the Register read/write operation.

CHKADR state 912 moves to IDLE state 902, Register reads will Fail Ack if Attention is active or CRC is enabled and miscompares. CHKADR state 912 moves to one of the register read/write command states, a REGRWGO state 918 when IOBUFL2 address does not match primitive base address. CHKADR state 912 moves to one of the primitive command states, a LDTAPCMD state 914 when IOBUFL2 address matches primitive r/w command address. CHKADR state 912 moves to a CHKSTOP state 924 when IOBUFL2 address matches one of the control command addresses. These commands are accomplished without any JTAG bus activity.

The Primitive Command States include the LDTAPCMD state 914 and a WAITTAPDONE state 916. The IOBUFL2 address bytes match the address reserved for directly communicating to the on chip JTAG interface. Either TMS or TDI/TDO activity will occur, but not both. Any number of bits, up to the width of the SSRL2 register will be transferred, according to the Primitive TAP Command loaded in IOBUFl2 byte ten.

In the LDTAPCMD State 914, (Load TAP Command), the TAP Command is loaded from IOBUFL2(byte ten) into the JTAG interface 204. The LoadCmd and ValidBytes signals work together to load significant byte-aligned data into the rightmost bytes of the SSRL2. This implies that the data must be sent by I²C right-aligned within the data field. For example: if BCR-b'000111', 9 bits will be transmitted to Access 114, LSByte of data from I²C physical interface 104 must contain 8 significant bits, the next byte from I²C physical interface 104 contains one significant bit, which must be sent as the right-most bit within that byte.

In the WAITTAPDONE state 916, (Wait for TAP Done), there is no action. The JTAG interface 204 is busy executing a Primitive TAP command. WAITTAPDONE State 916 moves to CHKSTOP state 224 with CmdDone from the JTAG interface 204 signaling when the hardware is finished.

In the CHKSTOP state 924, (Check for I²C Stop condition), the register read/write operations always transfer 8 bytes but Primitive commands may conclude with only a portion of the data being valid in SSRL2. IOcntL2 302 is loaded with ValidBytes which indicates how many left-aligned bytes contain valid data. For example: BCR 210 started with b'000111' (9 bit transfer). SSRL2 414 initially held right-aligned 9 bits, so only bytes 6, 7 were valid. After the Primitive command completed, TDO data was captured left-aligned in SSRL2 414, so only bytes 0, 1 are valid.

CHKSTOP state 924 moves to the IDLE state 902, when an I²C stop bit has been detected, and no further action is required. This is an unlikely path, unless the register read/ write operation is delayed with a long timeout. CHKSTOP state 924 moves to a LOADRESULTS state 926 when there is read data in the SSR 208 that needs to be returned to I²C physical interface 104. CHKSTOP state 924 moves to the WRTACK state 910 when the write requested by I²C physical interface 104 is complete and I²C physical interface 104 will be expecting the slave to acknowledge (ACK) the most recent byte transferred.

I²C Read states include the LOADRESULTS state 926, a READACK state 928, a WAITREAD state 930, and a RBYTE state 932.

In the I²C Read states, I²C physical interface 104 is reading bytes from a slave. A register read, Primitive, or Control read followed by the LOADRESULTS and READACK states 926 and 928 are executed each time the IO Buffer 201 runs out of data. The master owns all timing back from the slave. The master may read one or more bytes, terminating the I²C transfer when Ack=1. The loop formed by WAITREAD, RBYTE, and CHKOVRFLW states 930, 932 and 908 is executed once for every byte transferred.

In the LOADRESULTS State 926 (Load data from SSR to IOBUF), if the JTAG operation just performed was a Primitive, then the data is still in SSRL2 414 and must be copied into IOBUFL2 308. Otherwise this was already done in step six of a Register read/write operation described below, and the SSR is garbage.

In the READACK state 928 (Wait for Acknowledge of the I²C byte just read from slave), the Physical Interface 104 takes care of read timing, including waiting for the Ack bit. Referring also to FIG. 6, after Physical Interface 104 receives the Ack, Physical Interface 104 indicates that it needs another byte from IOBUF 201 by activating IAckReady which sets a NeedAckL2 latch. IsWrtReady is activated back to the Physical Interface 104 to indicate that the next byte is ready to be written from IOBUF 201 onto Is_Byte_I. At the same time, NeedAckL2 is reset.

READACK state 928 moves to the WAITREAD state 930 if the Physical Interface 104 is busy either sending another data byte back to the master, or if. Ack=1, waiting for the stop bit, which is the only possible condition allowed by I²C protocol upon termination of a read.

In the WAITREAD State 930 (Wait for I²C to read a byte from slave), there is no action. The Physical Interface 104 is busy either sending another data byte back to the master, or if Ack=1, waiting for the stop bit.

WAITREAD State 930 moves to the IDLE state 902 when the first data byte read by the master was acknowledged with a '1', then exitting to IDLE is provided as soon as the stop bit is detected by the Physical Interface 104. Otherwise, NeedAckL2 indicates when the Physical Interface 104 has completed sending another byte to the master and received Ack=1, upon which exitting to IDLE state 902 is provided. The IDLE state 902 will activate IsWrtReady to allow the Physical Interface 104 to begin looking for the stop bit, reset NeedAckL2, and consume the stop bit. WAITREAD State 930 moves to RBYTE state 932 when the Physical Interface 104 has received Ack=0, indicating another data byte is needed.

In the RBYTE State 932 (Set up to read another byte of data), the IOcntL2 302 is decremented, pointing to the next data byte in IOBUFL2 308.

Register read/write (REGRW) Command States include the REGRWGO state 918, a WAITCMDDONE state 920 and a CMDSTEP state 922. The IOBUFL2 address bytes do not match any address reserved for Primitive or Control commands. The address is interpreted directly as a register read/write address. Both TMS and TDI/TDO activity will occur in a sequence of defined steps in order to accomplish the register read/write operation. Exactly 64 bits, the width of the SSRL2 register 414 will be transferred.

In the REGRWGO State 918, (Start the (next) step of the Register Command Sequence), the (next) step in the Register sequence is put on the TapCmd bus and LoadCmd activated to start the JTAG interface 204. If IOcntL2=step 6, the data read by register read is in SSRL2 414 and needs to be saved to IOBUFL2 308 before the cleanup steps that return the Access 114 TAP controller to RunTestIdle, the final command steps would otherwise corrupt the data in the SSR. This is accomplished by activating BufLoad.

In the WAITCMDDONE State 920, Wait for TAP and/or Register read Done), there is no action. Either the JTAG Scan Logic is busy executing a Primitive TAP command or the Register read operation has been initiated but is not yet complete.

WAITCMDDONE state 920 moves to CMDSTEP state 922 when the CmdDone signal from JTAG Scan Logic indicates the most recent command step is complete and the RegisterRWdone signal is active after the SCIDLE signal form Access has gone inactive followed by a return to active. The RegisterRWdone signal is only significant during step 3 of a Register read, immediately after which the Register read operation should occur.

In the CMDSTEP state 922, (Advance to the next command step), IOcntL2 is incremented, IOcntL2 is being used in CmdMuxSel to index through the Register read/write command steps.

CMDSTEP state 922 moves to SCOMGO: Both Register read and write command sequences are exactly 7 steps long. If step 7 has not yet completed, looping back to initiate the next step is provided. CMDSTEP state 922 moves to the CHKSTOP state 924 when the 7th step has just completed.

Figure 11:
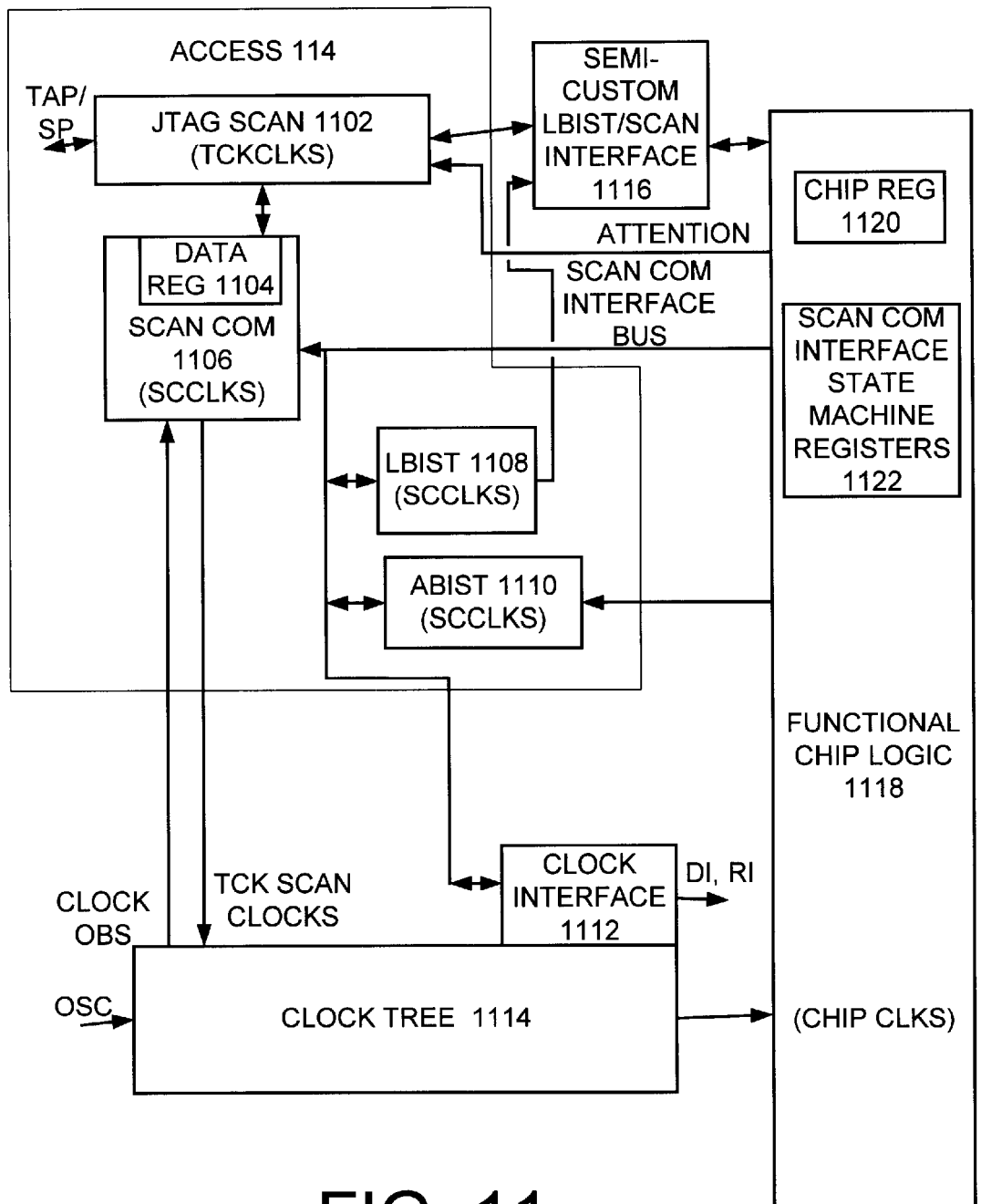
FIG. 11 is a block diagram representation illustrating a test access port (TAP) and boundary-scan architecture, Access of the manufacturing test interface and global inter integrated circuit ($I^2C$) bus interconnection apparatus of FIG. 1 in accordance with the preferred embodiment.

FIG. 11 illustrates primary functions of the test access port (TAP) and boundary-scan architecture, Access 114 of the manufacturing test interface and global inter integrated circuit (I²C) bus interconnection apparatus 100. Access provides a JTAG scan function 1102 and a scan communications function 1104. JTAG scan function 1102 allows the I²C slave state machine 102 to scan chip rings through the test access port (TAP) interface (IEEE 1149.1) indicated at line TAP/SP. The Attention output and a power-on-reset (POR) output are also provided indicated at line TAP/SP. The Attention output is provided to alert the I²C slave state machine 102 to conditions requiring observation or intervention/recovery.

Scan communications function 1104 provides a parallel data path between the functional logic of a chip and the scan function. Access operations can be performed while the chip clocks are running and the system is operating; the scan communications function 1104 takes advantage of this to allow communication with an operating chip or system.

A clock tree 1114 receives a TCK SCAN CLOCKS input from Access 114. Clock tree 1114 also outputs chip clocks. A semicustom LBIST/SCAN interface 1116 optionally is used to organize the chip scan rings into functional groups, such as level-sensitive scan design (LSSD) rings, and BIST channels. Interface 1116 is coupled between JTAG scan 1102 of Access 114 and functional chip logic 1118.

The new instruction of the preferred embodiment, Scan Communications Read-Immediate, added to the design of the Access 114 JTAG scan-cohtroller, facilitates the design of the new I²C-to-JTAG interface function.

Before design of new instruction, Scan Communications Read-Immediate, reading a chip register required two steps: Step 1: execute Access scan-controller command "Scan Communications Read" (hex code '17') to fetch contents of target chip reg, and load contents into Access Scan Communications Data Reg 1104. Step 2: execute Access scan-controller command "Scan-Out" (hex code '12') to read out contents of Access Scan Communications Data Reg 1104. This two-step process was designed to accommodate existing software and hardware.

With the new Scan Communications Read-Immediate command, steps 1 and 2 combine into a single step: execute Access scan-controller command "Scan Communications Read-Immediate" (hex code '14') to fetch contents of target chip reg 1120, and load contents into Access Scan Communications Data Register 1104, then immediately read out contents of Access Scan Communications Data Register 1104.

If the I²C-to-JTAG interface function was forced to use the original two-step process, it would need to attempt to execute the two steps in one clock cycle (one of its own I²C clock cycles). Since the I²C clock cycle can vary with respect to other system clocks, it cannot be guaranteed that both steps would successfully complete. By reducing the process to one step, it can now be guaranteed that the operation will complete in one clock cycle.

Operation of interconnection apparatus 100 and the I²C state machine 102 may be understood from the following examples.

A 64-bit register read/write operation begins with the start byte address (I²C slave base addr), optionally followed by up to 3 bytes of register read/write address (LSByte, high-order bit first). One implementation defines register read/write addresses that are eight byte aligned. A write must start with all 3 bytes of the register read/write address; a read may use a previously written address or modify one, two, or all three bytes (unless CRC checking is enabled) of the address before the restart/read byte. I²C slave implements a 24 bit register read/write address (23 down to 0, 0=LSB). Access/JTAG defines the LSB as a parity bit. The remaining 23 bits (23 down to 1) represent a byte-aligned address. The register read/write transfers are always 8-bytes wide, but each chip usually architects registers of varying widths that may not necessarily be aligned on 8-byte boundaries. The specific alignment of data within the I²C register read/write data field is chip implementation dependent. If a stopbit is received at this point only the portion of the address written will be altered, no other activity is initiated.

For a write operation, data for the write operation follows, starting with the fourth byte (LSByte, high-order bit first). A stop or overflow condition following one or more data bytes kicks off the register read/write operation, the register read/write address is not auto-incremented. An overflow/underflow occurs when more than 8 bytes of data are written/read. As an option to this design, the register read/write address could be auto-incremented to write/read successive register read/write addresses for writes/reads of more than 8-bytes. Writing more than 8 bytes of data will result in the data at the same register read/write address being overwritten. Writing less than 8 bytes of data will result in the register read/write address being written with a full 8 bytes, the most significant bytes of data will be written with whatever was left in the register read/write data IO buffer from the previous operation. With the CRC Checking enabled, the slave will not acknowledge the 9th (CRC) byte during a write to prevent from overwriting a good data transfer.

For a read operation, a restart (a stop followed by a start) is then issued on the I²C interface with the R/W bit='1'. This triggers a register read to be kicked off inside of the I²C hardware. The dataflow then reverses and the slave returns one data byte for each acknowledge (LSByte first). The register read/write address is not auto-incremented. If greater than 8 bytes are read, the data will be repeated starting with LSByte.

The non-register TAP command format is identified by the reserved register read/write addr (23:12)=x'524' (this address is relocatable). There are eight modes of operation, selected by the value of Tap Cmd bits 10:8. Bit 11 is reserved for future use. In the primitive TAP command (TapCmd Addr(11:8)="0000") format, the LSByte of the register read/write address is interpreted as a TAP command causing bits to be shifted out to the TAP port on TMS or TDI and capturing TDO. this enables the I²C interface 104 to perform any action supported by the JTAG logic. A stop or overflow condition kicks off the BCR with its current value for a Write operation and an overflow condition. Stop or Start with R/W Address bit set to 1 kicks off the BCR with its current value for a Read operation. Writing or reading more than "BCR_ value mod 8" (+1 if remainder is non-zero) bytes of data causes a BCR re-load to continue the data stream (i.e. Write/Read successive bytes in Scan Ring). With CRC checking enabled, all reads/write primitive and register read/write are suppressed unless the CRC byte is correctly transmitted.

Tap command example: 64 bit+bit ring register read/write out: (CRC disabled).

The following delineates the sequence of I²C Commands needed to perform a Primitive 64-Bit SCAN Out of an Internal Scan Ring followed by 1-bit Scan Out:

1. Load Primitive Command: Instruct Slave to Bring Tap State Machine first to Test Logic Reset and then to Shift-IR to scan in an instruction.

I²C Write Start w/R/W Bit=0, Length=5 Bytes, STOP

| Byte 1:08x | :10 TCK Pulses (Data after Addr/Cmd Bytes is TMS Sequence) |
|---|---|
| Byte 2:40x | :LSB of Primitive Cmd Address |
| Byte 3:52x | :MSB of Primitive Cmd Address |
| Byte 4:DFx | :TMS Sequence of values (taken from rightmost LSB to MSB) |
| Byte 5:00x | :TMS Sequence of values Continued (Gets Tap SM to Shift-IR) |

2. Load Primitive Command and Instruction Data:

Instruct Slave to Scan the following into the Tap Controller Instruction Register: 0F 80 00 41. This is a SCAN Out of the Internal Ring, Then take Tap S/M to Exit1-IR.

I²C Write Start w/R/W Bit=0), Length=7 Bytes, STOP

| Byte 1: DEx | :32 TCK Pulses |
|---|---|
| Byte 2: 40x | :LSB of Primitive Cmd Address |
| Byte 3: 52x | :MSB of Primitive Cmd Address |
| Byte 4: 41x | :LSB of Instruction |
| Byte 5: 00x | :next byte of Instruction |
| Byte 6: 80x | :next byte of Instruction |
| Byte 7: 0Fx | :MSB of Instruction (Scan Out of Internal Scan Ring) |

3. Load Primitive Command: Instruct Slave to Sequence Tap State Machine to Shift-DR (from Exit1-IR).
I²C Write Start w/R/W Bit=0, Length=4 Bytes, STOP

| | |
|---|---|
| Byte 1: 02x | :4 TCK Pulses |
| Byte 2: 40x | :LSB of Primitive Cmd Address |
| Byte 3: 52x | :MSB of Primitive Cmd Address |
| Byte 4: 03x | :TMS Sequence of values (taken from rightmost LSB to MSB Takes Tap S/M to Shift-DR) |

4. Load Primitive Cmd: Instruct Slave to initiate 64 TCK Pulses with TMS=0 for all and to hold Tap S/M in Shift-DR.
I²C Write Start Cmd: Instruct Slave to initiate 64 TCK Pulses with TMS=0 for all and to hold Tap S/M in Shift-DR

| | |
|---|---|
| Byte 1: BEx | :64 TCK Pulses |
| Byte 2: 40x | :LSB of Primitive Cmd Address |
| Byte 3: 52x | :MSB of Primitive Cmd Address |

5. Get Return Data for Scan Out Command - - - TMS is 0's, Leave Tap S/M in Shift-DR.
I²C Read Restart w/R/W Bit=1), Length=8 Bytes, STOP

| | |
|---|---|
| Byte 1: FEx | :LSB of DATA |
| Byte 2: 0Fx | :next byte of DATA |
| Byte 3: DCx | :next byte of DATA |
| Byte 4: BAx | :next byte of DATA |
| Byte 5: EFx | :next byte of DATA |
| Byte 6: BEx | :next byte of DATA |
| Byte 7: ADx | :next byte of DATA |
| Byte 8: DEx | :MSB Byte of data |

6. Load Next Primitive command: Instruct Slave to initiate 1 TCK Pulse with TMS=1 to kick Tap S/M to exit1-DR after 1-bit SCAN
I²C Write Start w/R/W Bit=0) Length=3 Bytes, STOP

| | |
|---|---|
| Byte 1: FFx | :1 TCK Pulse |
| Byte 2: 40x | :LSB of Primitive Cmd Address |
| Byte 3: 52x | :MSB of Primitive Cmd Address |

7. Get Return Data for Scan Out Command (1 Bit) - - - Kick Tap S/M to Exit1-DR
I²C Read Restart w/R/W Bit=1), Length=1 Byte, STOP

| | |
|---|---|
| Byte 1: FEx | :LSB of DATA (only the rightmost bit is valid) |

8. Load Next Primitive Command: Instruct Slave to Bring Tap State Machine to Test Logic Reset State
I²C Write Start w/R/W Bit=0), Length=4 Bytes, STOP

| | |
|---|---|
| Byte 1: 03x | :5 TCK of Pulses |
| Byte 2: 40x | :LSB of Primitive Cmd Address |
| Byte 3: 52x | :MSB of Primitive Cmd Address |
| Byte 4: 1FX | :Sequence of TMS Values form Rightmost Bit to LeftMost (only 5 bits used to return Tap State Machine to Reset) |

Tap Command Example: 2.5 Byte Register WRITE:
The following delineates the sequence of I²C Commands needed to SCAN in 2.5 Bytes (20 Bits) of data into the internal Scan Ring (NOTE: Resulting SCAN in data will be A EF BA hex).
1. Load Primitive Command: Instruct Slave to Bring Tap State Machine first to Test Logic Reset and then to Shift-IR to scan in an instruction
I²C Write Start w/R/W Bit=0, Length=5 Bytes, STOP

| | |
|---|---|
| Byte 1:08x | :10 TCK Pulses (Data after Addr/Cmd Bytes is TMS Sequence) |
| Byte 2:40x | :LSB of Primitive Cmd Address |
| Byte 3:52x | :MSB of Primitive Cmd Address |
| Byte 4:Dfx | :TMS Sequence of values (taken from rightmost LSB to MSB) |
| Byte 5:00x | :TMS Sequence of values Continued (Gets Tap SM to Shift-IR) |

2. Load Primitive Command and Instruction Data: Instruct Slave to Scan the following into the Tap Controller Instruction Register: 0F 80 00 41. This is a SCAN Out of the Internal Ring, Then take Tap S/M to Exit1-IR.
I²C Write Start w/R/W Bit=0), Length=7 Bytes, STOP

| | |
|---|---|
| Byte 1: Dex | :32 TCK Pulses |
| Byte 2: 40x | :LSB of Primitive Cmd Address |
| Byte 3: 52x | :MSB of Primitive Cmd Address |
| Byte 4: 41x | :LSB of Instruction |
| Byte 5: 00x | :next byte of Instruction |
| Byte 6: 80x | :next byte of Instruction |
| Byte 7: 0Fx | :MSB of Instruction (Scan Out of Internal Scan Ring) |

3. Load Primitive Command: Instruct Slave to Sequence Tap State Machine to Shift-DR (from Exit1-IR).
I²C Write Start w/R/W Bit=0, Length=4 Bytes, STOP

| | |
|---|---|
| Byte 1: 02x | :4 TCK Pulses |
| Byte 2: 40x | :LSB of Primitive Cmd Address |
| Byte 3: 52x | :MSB of Primitive Cmd Address |
| Byte 4: 03x | :TMS Sequence of values (taken from rightmost LSB to MSB Takes Tap S/M to Shift-DR) |

4. Load Primitive Cmd: Instruct Slave to initiate a 2-Byte SCAN-IN consisting of 2 series of 8 TCK Pulses with TMS=0 for all and to leave S/M in Shift-DR
I²C Write Start w/R/W Bit=0), Length=5 Bytes, STOP

| | |
|---|---|
| Byte 1: 06x | :TCK Pulses (TMS = 0 on all --NOTE: Because there are 2 bytes of data, 16 TCK Pulses are needed so the internal Slave Logic will kick off 2 separate 8-bit SCANs) |

-continued

| | |
|---|---|
| Byte 2: 40x | :LSB of Primitive Cmd Address |
| Byte 3: 52x | :MSB of Primitive Cmd Address |
| Byte 4: BAx | :First byte of DATA (LSB) |
| Byte 5: EFx | :next byte of DATA |

5. Load Primitive Cmd: Finish the 2.5 Byte SCAN-IN by scanning in the last 4 bits. The will be 4 TCK Pulses with TMS=0 for all but last TCK. The last TCK with TMS=1 will kick TAP S/M to Exit1-DR.

$I^2C$ Write Start w/R/W Bit=0), Length=4 Bytes, STOP

| | |
|---|---|
| Byte 1: C2x | :4 TCK Pulses (TMS = 0 on all but last TCK |
| Byte 2: 40x | :LSB of Primitive Cmd Address |
| Byte 3: 52x | :MSB of Primitive Cmd Address |
| Byte 4: BAx | :Most Significant 4 bits of SCAN-IN Data (Rightmost bits) |

6. Load Next Primitive Command: Instruct Slave to Bring Tap State Machine to Test Logic Reset State $I^2C$ Write Start w/R/W Bit=0), Length=4 Bytes, STOP

| | |
|---|---|
| Byte 1: 03x | :5 TCK of Pulses |
| Byte 2: 40x | :LSB of Primitive Cmd Address |
| Byte 3: 52x | :MSB of Primitive Cmd Address |
| Byte 4: 1Fx | :Sequence of TMS Values from Rightmost Bit to LeftMost (only 5 bits used to return Tap State Machine to Reset) |

Null TAP Command (TapCmd Addr(11:8)="0001")

JTAG activity on TCK/TMS/TDI is suppressed. This mode is intended, for example, to read back IR status information immediately following a Tap Cmd sequence which scans a new command into the IR.

An $I^2C$ write to the SSR Data (IO Buffer) has no effect. An $I^2C$ read of the SSR Data will return the most recent JTAG/TDO data scanned out.

Tap Command Example: Reading IR Status Immediately After Scanning in an Instruction:

1. Load Primitive Command: Instruct Slave to Bring Tap State Machine first to Test Logic Reset and then to Shift-IR to scan in an instruction.

$I^2C$ Write Start w/R/W Bit=0, Length=5 Bytes, STOP

| | |
|---|---|
| Byte 1:08x | :10 TCK Pulses (Data after Addr/Cmd Bytes is TMS Sequence) |
| Byte 2:40x | :LSB of Primitive Cmd Address |
| Byte 3:52x | :MSB of Primitive Cmd Address |
| Byte 4:Dfx | :TMS Sequence of values (taken from rightmost LSB to MSB) |
| Byte 5:00x | :TMS Sequence of values Continued (Gets Tap SM to Shift-IR) |

2. Load Primitive Command and Instruction Data: Instruct Slave to Scan the following into the Tap Controller Instruction Register: 0F 80 00 41. This is a SCAN Out of the Internal Ring, Then take Tap S/M to Exit1-IR.

$I^2C$ Write Start w/R/W Bit=0), Length=7 Bytes, STOP

| | |
|---|---|
| Byte 1: Dex | :32 TCK Pulses |
| Byte 2: 40x | :LSB of Primitive Cmd Address |
| Byte 3: 52x | :MSB of Primitive Cmd Address |
| Byte 4: 41x | :LSB of Instruction |
| Byte 5: 00x | :next byte of Instruction |
| Byte 6: 80x | :next byte of Instruction |
| Byte 7: 0Fx | :MSB of Instruction (Scan Out of Internal Scan Ring) |

3. Load Primitive Command: Instruct Slave to Read what was last SCANNED OUT of Scan Controller (This will be the IR-STATUS since an Instruction Register Scan was the last operation)

$I^2C$ Write Start w/R/W bit=0, Length=3 Bytes, STOP

| | |
|---|---|
| Byte 1: --x | :This Byte is a Don't Care for this command |
| Byte 2: 41x | :LSB of Primitive Cmd Address |
| Byte 3: 52x | :MSB of Primitive Cmd Address |

4. Get Return Data for Primitive Read Command - - - Return Data that was Scanned Out (represented by dashes below)

$I^2C$ Read Restart w/R/W Bit=1), Length=4 Bytes, STOP

| | |
|---|---|
| Byte 1: --x | :LSB of IR Status |
| Byte 2: --x | :next byte of IR Status |
| Byte 3: --x | :next byte of IR Status |
| Byte 4: --x | :MSB of IR Status |

5. Load Next Primitive Command: Instruct Slave to Bring Tap State Machine to Test Logic Reset State $I^2C$ Write Start w/R/W Bit=0), Length=4 bytes, STOP

| | |
|---|---|
| Byte 1: 03x | :5 TCK Pulses |
| Byte 2: 40x | :LSB of Primitive Cmd Address |
| Byte 3: 52x | :MSB of Primitive Cmd Address |
| Byte 4: 1Fx | :Sequence of TMS values from Rightmost Bit to Leftmost (only 5 bits used to return Tap State Machine to Reset) |

Issue $I^2C$ stop sequence

Enable Attention Command (TapCmd Addr(11:8)= "0010") $I^2C$ method of Enabling attention raised from access.

An $I^2C$ write to the SSR Data (IO Buffer) enables attention checking by $I^2C$ slave. JTAG activity is suppressed.

Note that when this sequence is written, the slave will then acknowledge Register read/write operations only when attention is not active. When Attention is active, only primitive Tap commands will be acknowledged with the standard $I^2C$ ack pulse.

Tap Command Example: Re-Enabling attention checking internally
1. I²C Write Start w/R/W Bit=0), Length=4 Bytes, STOP

| 2. | Byte 1: --x | |
|---|---|---|
| | Byte 2: 42x | :LSB of Primitive Cmd Address |
| | Byte 3: 52x | :MSB of Primitive Cmd Address |

3. Issue I²C Stop sequence
Disable. Attention Command (TapCmd Addr(11:8)= "0011"). I²C method of disabling attention raised from access.
An I²C write to the SSR Data (IO Buffer) disables attention checking by I²C slave.
Note that when this sequence is written the slave will acknowledge primitive commands as well as register read/write sequences even if Attention is active. This method is used for overriding issues such as machine check being active which would in turn cause an attention to be raised. This does not correct an attention being raised from an register read/write error and the data received after an register read/write error should be disregarded. By default attention is masked off.

Tap Command Example: Masking attention internally
1. I²C Write Start w/R/W Bit 0), Length=4 Bytes, STOP

| 2. | Byte 1: --x | |
|---|---|---|
| | Byte 2: 43x | :LSB of Primitive Cmd Address |
| | Byte 3: 52x | :MSB of Primitive Cmd Address |

3. Issue I²C Stop sequence
Primitive Command Example: Enabling CRC checking internally. This sequence of bytes turns on CRC Checking.
1. I²C Write Start w/R/W Bit=0), Length=3 Bytes, STOP

| 2. | Byte 1: --x | |
|---|---|---|
| | Byte 2: 45x | :LSB of Primitive Cmd Address |
| | Byte 3: 52x | :MSB of Primitive Cmd Address |

3. Issue I²C Stop sequence
Note: CRC checking will now be enabled until byte 2:45x and Byte 3:52x are sent to the slave.

Example: Performing a Register read using CRC
For this example one implementation of CRC uses: $x^8+x^4+x^3+x^2+1$ for 8-bit CRC accumulator.
For this example one implementation of CRC uses: $x^8+x^4+x^3+x^2+1$ for 8-bit CRC accumulator.
Write Primitive Decode to turn CRC Checking on
1. I²C Write Start w/R/W Bit=0), Length=3 Bytes, STOP

| 2. | Byte 1: --x | |
|---|---|---|
| | Byte 2: 45x | :LSB of Primitive Cmd Address |
| | Byte 3: 52x | :MSB of Primitive Cmd Address |

3. Issue I²C Stop sequence
(CRC_CHECKING is now enabled)
Send in the address to be read and the CRC byte for the slave address and the 3 byte address (59x in this ex.)

1. I²C Write Start w/R/W Bit=0), Length=4 Bytes, STOP

| 2. | Byte 1: 03x | :-LSB of Register read/write address |
|---|---|---|
| | Byte 2: 00x | :-Mid byte of Register read/write Address |
| | Byte 3: 80x | :-MSB of Register read/write Address |
| | Byte 4: 59x | :-CRC byte after 8 0's shifted in |

3. Issue I²C Stop sequence
(Register read/write address 800003 is stored in the slave)
Read as many bytes as you want until done, the CRC byte is calculated only on the data that is sent back on the I²C bus.
1. I²C Write Start w/R/W Bit=1, Length=8 Bytes, STOP read Bytes 1–8 for this example. (variable length)
2. Issue I²C Stop sequence
To obtain the CRC byte that was calculated on the last read operation, you need to transmit the primitive decode '5247'x along with '11'x as the CRC byte (if '03'x is sent in the don't care part of the command)
1. I²C Write Start w/R/W Bit=0, Length=4 Bytes, STOP

| 2. | Byte 1: --x | :-don't cares for CRC read (03x used in this case) |
|---|---|---|
| | Byte 2: 47x | :-read CRC decode Address |
| | Byte 3: 52x | :-MSB of Primitive Address |
| | Byte 4: 11x | :-CRC byte after 8 0's shifted in |

3. Issue I²C Stop sequence
(Register read/write address 800003 is stored in the slave)
After sending down the primitive decode for the CRC read, a read sequence can be performed to obtain the CRC for the Register read that was performed. Only one byte is valid so you should only read one byte or ignore the rest. The Master should no-ack ('1'b) this byte so it is possible to perform this operation without causing a bus error.
1. I²C Write Start w/R/W Bit=1), Length=1 Byte, STOP read Byte #1 for this example (only one byte is valid)
2. Issue I²C Stop sequence
Note that the CRC byte should be sent through the previously calculated byte to zero out the register.
This sequence of bytes turns off CRC Checking.
1. I²C Write Start w/R/W Bit=0. Length=3 Bytes, STOP

| 2. | Byte 1: --x | :-TCK Pulses |
|---|---|---|
| | Byte 2: 46x | :LSB of Primitive Cmd Address |
| | Byte 3: 52x | :MSB of Primitive Cmd Address |

3. Issue I²C Stop sequence
CRC Checking is now disabled for the next programmer.
While the present invention has been described with reference to the details of the embodiments of the invention shown in the drawing, these details are not intended to limit the scope of the invention as claimed in the appended claims.

What is claimed is:
1. Apparatus for connecting a manufacturing test interface to a global serial bus comprising:
input/output buffer logic, said input/output buffer logic buffering data to be transferred to and from said global serial bus;
a slave interface logic connected to said input/output buffer logic and coupled to the manufacturing test interface, said slave interface logic receiving and send- ing data from the manufacturing test interface to said input/output buffer logic; and a slave controller coupled to said input/output buffer logic and said slave interface logic, said slave controller pacing data exchange to said input/output buffer logic; said slave controller receiving control commands from said global serial bus.

2. The apparatus for connecting a manufacturing test interface to a global serial bus as recited in claim 1 further includes error handling logic coupled between said input/output buffer and the global serial bus, said error handling logic processing an error condition.

3. The apparatus for connecting a manufacturing test interface to a global serial bus as recited in claim 2 wherein said error handling logic includes a Cyclic Redundancy Check (CRC) calculation logic.

4. The apparatus for connecting a manufacturing test interface to a global serial bus as recited in claim 1 wherein said global serial bus includes an inter integrated circuit ($I^2C$) bus.

5. The apparatus for connecting a manufacturing test interface to a global serial bus as recited in claim 1 wherein said manufacturing test interface includes a Joint Test Action Group (JTAG) interface, and wherein said slave interface logic processes JTAG-format commands received from and transmitted to said JTAG interface.

6. The apparatus for connecting a manufacturing test interface to a global serial bus as recited in claim 5 further includes error handling logic coupled between said input/output buffer and the global serial bus, said error handling logic processing an error condition wherein said JTAG interface provides an Attention signal to said error handling logic, said Attention signal indicating an error.

7. The apparatus for connecting a manufacturing test interface to a global serial bus as recited in claim 6 wherein said error handling logic includes a Cyclic Redundancy Check (CRC) calculation logic; said CRC calculation logic being enabled for implementing CRC calculations.

8. The apparatus for connecting a manufacturing test interface to a global serial bus as recited in claim 6 wherein said slave interface logic is configured to enable and to disable error checking responsive to said Attention signal.

9. The apparatus for connecting a manufacturing test interface to a global serial bus as recited in claim 5 wherein said slave controller paces data exchange between said slave interface logic and said JTAG interface.

10. The apparatus for connecting a manufacturing test interface to a global serial bus as recited in claim 5 wherein said slave controller provides data steering and routing for data exchange between said slave interface logic and said JTAG interface.

11. The apparatus for connecting a manufacturing test interface to a global serial bus as recited in claim 5 wherein said slave controller provides an ordered sequence of commands to said slave interface logic for register read and write operations.

12. The apparatus for connecting a manufacturing test interface to a global serial bus as recited in claim 5 wherein said slave interface logic processes simultaneous JTAG read and write operations and wherein said slave controller provides a write operation, followed by a read operation for a JTAG instruction register (IR) status read operation.

13. The apparatus for connecting a manufacturing test interface to a global serial bus as recited in claim 5 wherein said slave controller provides a start byte address followed by a register read/write address for register read and write operations.

14. The apparatus for connecting a manufacturing test interface to a global serial bus as recited in claim 5 wherein said slave controller provides an ordered sequence of commands to said slave interface logic for scan communications register read and write operations.

15. The apparatus for connecting a manufacturing test interface to a global serial bus as recited in claim 5 wherein said global serial bus includes an inter integrated circuit ($I^2C$) bus and a physical interface coupled between said $I^2C$ bus and said input/output buffer logic, wherein said slave controller paces data exchange between said physical interface and said input/output buffer logic.

16. The apparatus for connecting a manufacturing test interface to a global serial bus as recited in claim 15 wherein said slave controller provides data steering for data exchange between said physical interface and said input/output buffer logic.

17. The apparatus for connecting a manufacturing test interface to a global serial bus as recited in claim 5 wherein said slave controller provides commands to said slave interface logic for a register read operation.

18. The apparatus for connecting a manufacturing test interface to a global serial bus as recited in claim 5 wherein said slave controller provides commands to said slave interface logic for a register write operation.

19. The apparatus for connecting a manufacturing test interface to a global serial bus as recited in claim 5 wherein said slave interface logic includes a test clock (TCK) generation logic.

20. The apparatus for connecting a manufacturing test interface to a global serial bus as recited in claim 5 wherein said slave interface logic receives a load command signal from said JTAG interface.

21. The apparatus for connecting a manufacturing test interface to a global serial bus as recited in claim 20 wherein said JTAG interface and said slave interface logic are connected by an internal JTAG bus and said load command signal is activated to initiate activity on said internal JTAG bus.

22. The apparatus for connecting a manufacturing test interface to a global serial bus as recited in claim 5 wherein said global serial bus includes an inter integrated circuit ($I^2C$) bus and wherein an acknowledge signal is used for error handling.

23. The apparatus for connecting a manufacturing test interface to a global serial bus as recited in claim 5 wherein said slave controller provides a command to said slave interface logic to perform one or more primitive operations.

24. The apparatus for connecting a manufacturing test interface to a global serial bus as recited in claim 5 wherein said primitive operation selects at least one of control, instruction, data and status exchange to said JTAG interface.

25. The apparatus for connecting a manufacturing test interface to a global serial bus as recited in claim 5 wherein said JTAG interface includes a scan communications read-immediate logic.

26. The apparatus for connecting a manufacturing test interface to a global serial bus as recited in claim 5 wherein said scan communications read-immediate logic performs one step to fetch and load a target register contents into a scan communications data register and immediately read out said contents of said scan communications data register.

27. The apparatus for connecting a manufacturing test interface to a global serial bus as recited in claim 1 wherein said slave controller provides data steering and routing for data exchange to said input/output buffer logic.

28. A method for connecting a manufacturing test interface to a global serial bus comprising the steps of:

providing a slave state machine between a physical interface and an internal bus, said physical interface connected to said global serial bus and said internal bus connected to said manufacturing test interface; utilizing said slave state machine for performing the steps of:

buffering data to be transferred to and from said global serial bus from and to said manufacturing test interface;

receiving control flow from said global serial bus to said manufacturing test interface; and pacing data exchange between said manufacturing test interface and said global serial bus.

29. The method for connecting a manufacturing test interface to a global serial bus as recited in claim 28 wherein said slave state machine further performs the step of processing an error condition.

30. The method for connecting a manufacturing test interface to a global serial bus as recited in claim 28 wherein said slave state machine further performs the steps of providing commands for a scan communications read operation.

31. The method for connecting a manufacturing test interface to a global serial bus as recited in claim 28 wherein said slave state machine further performs the steps of providing commands for a scan communications write operation.

32. The method for connecting a manufacturing test interface to a global serial bus as recited in claim 28 wherein said slave state machine further performs the steps of providing commands for a control read operation.

33. The method for connecting a manufacturing test interface to a global serial bus as recited in claim 28 wherein said slave state machine further performs the steps of providing commands for a control write operation.

34. The method for connecting a manufacturing test interface to a global serial bus as recited in claim 28 wherein said slave state machine further performs the steps of providing commands for a primitive write operation.

35. The method for connecting a manufacturing test interface to a global serial bus as recited in claim 28 wherein said slave state machine further performs the steps of providing commands for a primitive read operation.

36. An integrated circuit device for connecting a manufacturing test interface to a global serial bus, said integrated circuit device comprising:

input/output buffer logic, said input/output buffer logic buffering data to be transferred to and from said global serial bus;

a slave interface logic connected to said input/output buffer logic and coupled to the manufacturing test interface, said slave interface logic receiving and sending data from the manufacturing test interface to said input/output buffer logic; and a slave controller coupled to said input/output buffer logic and said slave interface logic, said slave controller pacing data exchange to said input/output buffer logic; said slave controller receiving control commands from said global serial bus.

37. The integrated circuit device as recited in claim 36 further includes error handling logic coupled between said input/output buffer logic and said slave interface logic.

* * * * *